(12) United States Patent
Brenner et al.

(10) Patent No.: US 10,244,095 B2
(45) Date of Patent: Mar. 26, 2019

(54) REMOVABLE COMPUTING DEVICE THAT FACILITATES COMMUNICATIONS

(71) Applicant: Google LLC, Mountain View, CA (US)

(72) Inventors: Andrew Scott Brenner, Mountain View, CA (US); Patrick Brady, Mountain View, CA (US); Rupinder Kataria, Mountain View, CA (US); Karl Alun Townsend, Mountain View, CA (US); Sharlik Shah, Mountain View, CA (US); Andrey Gubarev, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/316,443

(22) PCT Filed: Sep. 9, 2016

(86) PCT No.: PCT/UA2016/000106
§ 371 (c)(1),
(2) Date: Dec. 5, 2016

(87) PCT Pub. No.: WO2018/048375
PCT Pub. Date: Mar. 15, 2018

(65) Prior Publication Data
US 2018/0146081 A1    May 24, 2018

(51) Int. Cl.
*H04W 76/14*    (2018.01)
*H04M 1/725*    (2006.01)
(Continued)

(52) U.S. Cl.
CPC ..... *H04M 1/72527* (2013.01); *H04M 1/2745* (2013.01); *H04M 1/274516* (2013.01);
(Continued)

(58) Field of Classification Search
CPC ............ G07C 9/00111; G07C 9/00119; G07C 2209/06; G07C 2009/0019;
(Continued)

(56) References Cited

U.S. PATENT DOCUMENTS 6,993,367 B2    1/2006    Yamato et al.
7,672,757 B2    3/2010    Hong et al.
(Continued)

FOREIGN PATENT DOCUMENTS

WO    2006/067541    6/2006

OTHER PUBLICATIONS

International Search Report and Written Opinion in International Application No. PCT/UA2016/000106, dated May 26, 2017, 14 pages.
(Continued)

*Primary Examiner* — Kwasi Karikari
(74) *Attorney, Agent, or Firm* — Shumaker & Sieffert, P.A.

(57) ABSTRACT

Methods, systems, and computer-readable media for receiving, by a removable computing device that is electrically connected to a computing system through a physical connection, contact information from a contact list that is assigned to a user account. The user account is associated with a mobile computing device that is in wireless communication with the removable computing device. The removable computing device is configured to physically disconnect from the computing system. The removable computing device provides the computing system with the contact information for presentation by a display of the computing system. The removable computing device receives from the computing system an indication of user input requesting that the mobile computing device initiate communication with a device identified by the contact information. The removable
(Continued)

computing device transmits data to the mobile computing device that causes the mobile computing device to initiate the communication with the device identified by the contact information.

20 Claims, 8 Drawing Sheets

(51) Int. Cl.
*H04M 1/2745* (2006.01)
*H04M 1/60* (2006.01)

(52) U.S. Cl.
CPC ....... *H04M 1/6075* (2013.01); *H04M 1/7253* (2013.01); *H04W 76/14* (2018.02); *H04M 1/72547* (2013.01)

(58) Field of Classification Search
CPC ...... G07C 2009/00984; H04L 63/0853; H04L 2209/80; H04L 2209/84; H04L 63/0492; H04L 67/125; G06F 21/34; G06F 21/35; G06F 17/30867
See application file for complete search history.

(56) References Cited

U.S. PATENT DOCUMENTS

| | | | |
|---|---|---|---|
| 8,195,145 B2 | 6/2012 | Angelhag | |
| 8,787,987 B2 | 7/2014 | Gullapalli et al. | |
| 9,100,809 B2 | 8/2015 | Olincy et al. | |
| 9,146,900 B2 | 9/2015 | Wang et al. | |
| 9,374,693 B1 | 6/2016 | Olincy et al. | |
| 2006/0019720 A1* | 1/2006 | Kakehi | H04M 1/6091 |
| | | | 455/569.2 |
| 2007/0015537 A1 | 1/2007 | Debiasio et al. | |
| 2008/0259829 A1 | 10/2008 | Rosenblatt | |
| 2009/0011799 A1* | 1/2009 | Douthitt | H04M 1/274516 |
| | | | 455/569.1 |
| 2010/0253535 A1* | 10/2010 | Thomas | H04B 1/082 |
| | | | 340/4.37 |
| 2010/0330975 A1 | 12/2010 | Basir | |
| 2014/0256304 A1 | 9/2014 | Frye et al. | |

OTHER PUBLICATIONS

'www.att.com' [online] "Audiovox Car Connection 2.0," © 2017, [retrieved on Mar. 8, 2017] Retrieved from Internet: URL<https://www.att.com/devices/audiovox/car-connection-elite-series.html#sku=sku6900244> 4 pages.

* cited by examiner

REMOVABLE COMPUTING DEVICE THAT FACILITATES COMMUNICATIONS

CROSS-REFERENCE TO RELATED APPLICATION

This application is a National Stage Application under 35 U.S.C. § 371 and claims the benefit of International Application No. PCT/UA2016/000106, filed Sep 9, 2016. The disclosure of the foregoing application is hereby incorporated by reference in its entirety.

TECHNICAL FIELD

This specification relates to hardware and software for data communications, and one particular implementation relates to a device for facilitating communications between other devices.

BACKGROUND

Mobile computing devices such as smartphones can enable users to place or receive telephone calls, or send or receive messages, including text messages and emails. Mobile computing devices can sometimes communicate with other devices through the internet or through a local network to enable user input at a device to cause another device to perform operations.

SUMMARY

This disclosure generally relates to a removable computing device that facilitates communications. In some examples, the removable computing device is a dongle that a user can insert into a data communication port of a vehicle. The removable computing device may enable a user in the vehicle to interact with a display that is mounted in a dash of the vehicle to use their smartphone. For example, the user can place telephone calls or send text messages or other messages using their smartphone, and use hardware of the vehicle (e.g., a display, speakers, or microphone) to facilitate the communication.

The user may leave the removable computing device installed in the data communication port of the vehicle, and upon a mobile computing device entering the proximity of the removable computing device (e.g., due to a user entering the vehicle with his smartphone on him), the mobile computing device may automatically pair with the removable computing device without user interaction with either the removable computing device or mobile computing device. The two devices may then wirelessly communicate directly (e.g., using Bluetooth or WI-FI communication protocols), or indirectly (e.g., relaying the communications through an intermediate device, such as a component of a cellular network).

A user account for a service provider may be assigned to or otherwise associated with the mobile computing device. For example, a user of the mobile computing device may have at one point logged into the user account by providing credentials (e.g., a username and password) for the user account. At that point, the mobile computing device may be permitted to download information that is associated with the user account, for example, a list of contacts, emails, etc., that would otherwise not be available on the device should the user have not provided the correct credentials. The mobile computing device, upon pairing with the removable computing device, may communicate to the removable computing device information that identifies the user account. Knowledge of the user account may allow the remote computing device to access the information that is associated with the user account directly from the service provider (e.g., through a cellular network without such information passing through the mobile computing device).

As previously mentioned, the presence of the removable computing device may enable a user to place phone calls or send text messages using the devices that are a part of the vehicle (e.g., those devices that were integrated into the vehicle upon its sale at a dealership). Doing so, however, may leverage the radios of the removable computing device and the mobile computing device, in addition to using user account data that is stored by either of the removable computing device and the mobile computing device. For example, a user may interact with a touchscreen display that is built into the dash of the vehicle to select a user interface element that, upon selection, causes the vehicle computing system to present on the touchscreen a list of contacts that are associated with the user account. The list of contacts (and contact information for each contact) may have been sent to the vehicle computing system from the removable computing device. The removable computing device may have obtained the list of contacts (including the contact information for each contact) from the user's mobile computing device, or may have obtained the contact information directly from the service provider through the internet, even though the identification of the user account may have been transmitted to the removable computing device directly from the mobile computing device.

The user may select a particular contact on the display (e.g., by contacting a user interface element that identifies the particular contact), which may cause the display to present user interface elements that identify one or more mechanisms by which the particular contact can be contacted (e.g., by telephone or text message). If the user elects to place a phone call by pressing a user interface element that identifies the telephone mechanism (e.g., a button that lists the contact's telephone number, or that says "Call user"), the combination of computing devices discussed herein may perform operations to place a call using the cellular radio of the mobile computing device. If the user elects to send a text message, the vehicle computing system may prompt the user to provide content for the text message (e.g., by typing or speaking content for the text message through an input device that is in communication with the vehicle computing system). Upon receiving the text message content, the combination of computing devices may perform operations to send the text message.

The operations to place the call or send the text message involve communications sent between the vehicle computing system, the removable computing system, and the mobile computing device. For example, once the user has provided input using the car's computing system to either place a phone call or send a text message, the car computing system may send an appropriate command to the removable computing device. The command may include an indication of the telephone number to be called or to which the text message is to be directed. If the command is to send a text message, the command may further include text to form a body of the text message or audio data that is to be transcribed into text that will form the body of the text message.

In some implementations, if the text message can be transmitted over the internet rather than over the public switched telephone network (e.g., because the destination is associated with an IP address rather than a telephone number), the removable computing device may send a command over the internet to send the text message. In many cases however, the removable computing devices forwards the command, or one generated in response thereto, to the mobile computing device. The mobile computing device, in response, initiates a telephone call or sends a text message directed to the identified telephone number.

Should the mobile computing device have initiated a telephone call (e.g., because the user pressed a "Call" button), the mobile computing device may wirelessly send the audio information that the mobile computing device receives over the cellular network directly to the vehicle computing system through a wireless data transfer, without that audio information passing through communications with the removable computing device. The mobile computing device may route the audio information in this manner, because the mobile computing device may have paired with the vehicle computing system in addition to the removable computing device. This dual pairing can be beneficial because the vehicle may already be equipped to communicate with the mobile computing device to provide speaker phone functionality, but may not be equipped to obtain contact list information and other forms of data from the mobile computing device, without the assistance of the removable computing device. Similarly, audio that is received by a microphone in the vehicle may be wirelessly transmitted directly to the mobile computing device without the audio data passing through the removable computing device.

The mobile computing device may transmit some call information, such as time of call, a name of the person being called, and an image associated with the called person, to the vehicle computing system through the removable computing device, rather than directly to the vehicle computing system. Similarly, the vehicle display may present user interface elements that enable a user to interact with the telephone call, for example, by adding another user to the call to turn the call into a conference call, by ending the call, or by muting the call. In response to selection of these user interface elements, the vehicle computing system may pass a command for the mobile computing device to perform the appropriate action through the removable computing device. As such, some information (e.g., audio) may pass between the vehicle computing system and the mobile computing device without passing through the removable computing device, while other information (e.g., call information or some call commands) may pass through the removable computing device.

Embodiment 1 is directed to a computer-implemented method. The method comprises receiving, by a removable computing device that is electrically connected to a computing system through a physical connection, contact information from a contact list that is assigned to a user account, wherein: the user account is associated with a mobile computing device that is in wireless communication with the removable computing device, and the removable computing device is configured to physically disconnect from the computing system. The method comprises providing, by the removable computing device and to the computing system, the contact information for presentation by a display of the computing system. The method comprises receiving, by the removable computing device and from the computing system, an indication of user input received by the computing system to request that the mobile computing device initiate communication with a device that is identified by the contact information. The method comprises transmitting, by the removable computing device for receipt by the mobile computing device, data that causes the mobile computing device to initiate the communication with the device that is identified by the contact information.

Embodiment 2 is the method of embodiment 1, wherein: the computing system is a computing system installed in a vehicle; the removable computing device is a computerized dongle that is insertable into a data communication port of the vehicle; and the mobile computing device is a smartphone.

Embodiment 3 is the method of embodiment 1, wherein: the contact information includes a telephone number; and the communication that the mobile computing device initiates with the device that is identified by the contact information is a telephone call with a device that is identified by the telephone number.

Embodiment 4 is the method of embodiment 3, wherein the data that causes the mobile computing device to initiate the communication is data that causes the mobile computing device to wirelessly transmit audio from the telephone call directly to the computing system without the audio being transmitted to the removable computing device.

Embodiment 5 is the method of embodiment 4. The method comprises receiving, by the removable computing device in response to the removable computing device having transmitted the data that causes the mobile computing device to initiate the communication, data that identifies characteristics of the telephone call. The method comprises providing, by the removable computing device to the computing system, the data that identifies characteristics of the telephone call for presentation by the display of the computing system, wherein the presentation of the characteristics of the telephone call is provided concurrent with the wireless transmission of audio from the mobile computing device directly to the computing system.

Embodiment 6 is the method of embodiment 1, wherein receiving the contact information comprises (i) receiving the contact information from the mobile computing device through a wireless communication from the mobile computing device to the removable computing device, or (ii) receiving the contact information from a server to the removable computing device through a wireless communication that is not transmitted by the mobile computing device.

Embodiment 7 is the method of embodiment 1. The method comprises receiving, by the removable computing device and from the mobile computing device, data indicating that a telephone call has been initiated with the mobile computing device, wherein the data indicating that a telephone call has been initiated with the mobile computing device identifies characteristics of the telephone call initiated with the mobile computing device. The method comprises providing, by the removable computing device to the computing system, information including at least a portion of characteristics of the telephone call initiated with the mobile computing device for presentation by the display of the computing system. The method comprises receiving, by the removable computing device and from the computing system, an indication of user input received by the computing system to request that the mobile computing device accept the telephone call initiated with the mobile computing device. The method comprises transmitting, by the removable computing device for receipt by the mobile computing device, data that causes the mobile computing device to accept the telephone call initiated with the mobile computing device.

Embodiment 8 is the method of embodiment 1. The method comprises outputting, by the removable computing device, an audio signal encoding an address that identifies the removable computing device, wherein the mobile computing device is configured to: receive the audio signal, decode the audio signal to obtain the address encoded in the audio signal, transmit the address encoded in the audio signal to a server through a wireless communication, in response to transmitting the address encoded in the audio signal to the server, receive data that identifies the removable computing device, and establish a wireless communication channel with the removable computing device based at least on receiving the data that identifies the removable computing device.

Embodiment 9 is the method of embodiment 1, wherein: the contact information includes a telephone number; the indication of user input received by the computing system to request that the mobile communication device initiate communication with the device that is identified by the contact information comprises message content for transmission in a message communication to the device that is identified by the telephone number; and the data that causes the mobile computing device to initiate the communication causes the mobile computing device to transmit data that includes the message content through a wireless communication to the device that is identified by the telephone number.

Embodiment 10 is the method of embodiment 1. The method comprises receiving, by the removable computing device and from the computing system, an indication of user input received by the computing system to request a message communication to a recipient identified by an identifier, the indication comprising message content to be included in the message communication to the recipient identified by the identifier. The method comprises in response to receiving the indication, transmitting, by the removable computing device through a wireless communication to a server, a message communication to the recipient identified by the identifier that includes the message content.

Embodiment 11 is directed to a system that comprises at least one processor; and a data store coupled to the one or more processors having instructions stored thereon which, when executed by the at least one processor, causes the one or more processors to perform the method of any of embodiments 1-10.

The details of one or more implementations are set forth in the accompanying drawings and the description below. Other features, objects, and advantages will be apparent from the description and drawings, and from the claims.

DESCRIPTION OF DRAWINGS

Like reference numbers and designations in the various drawings indicate like elements.

DETAILED DESCRIPTION

Figure 1:
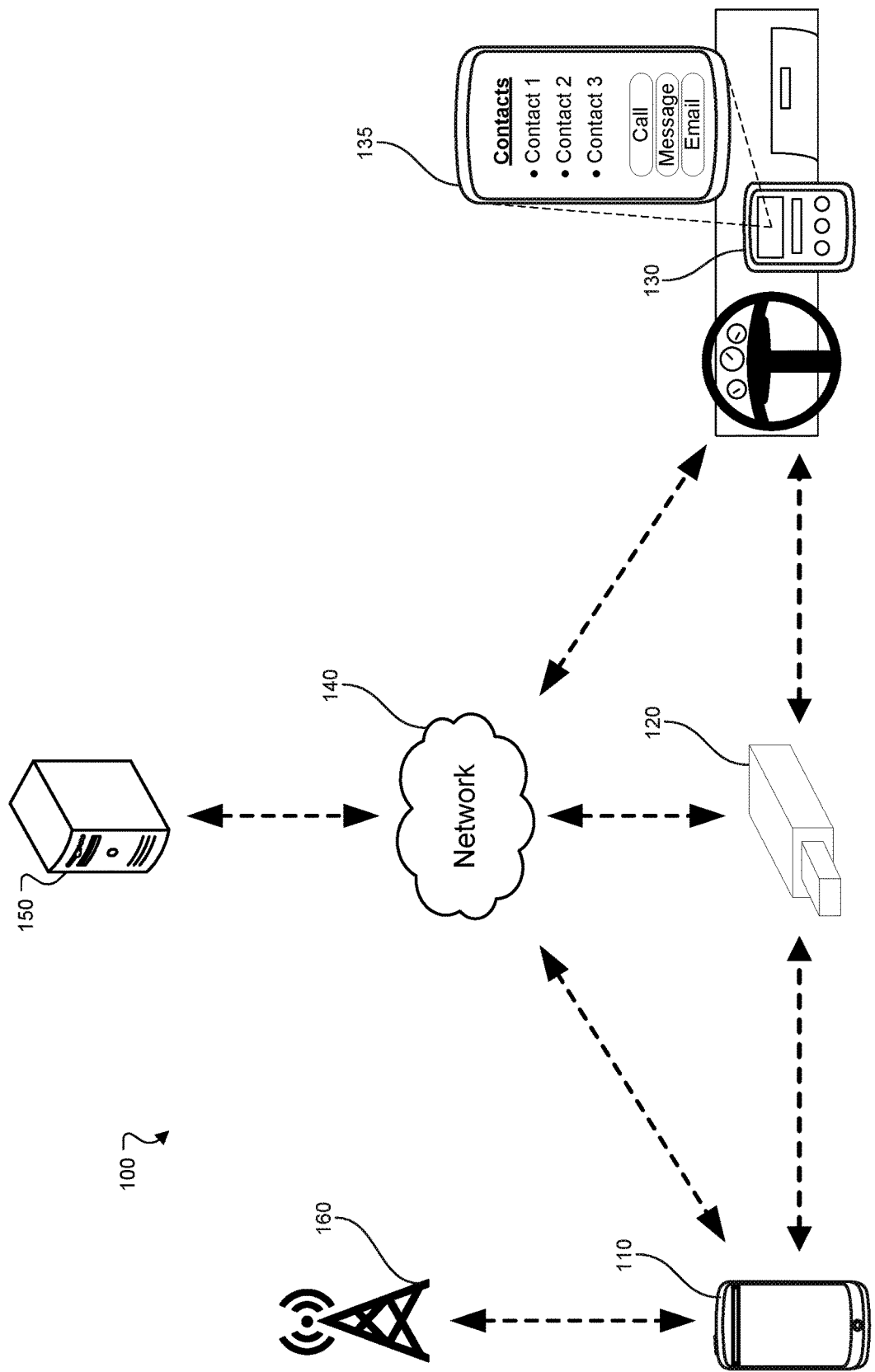
FIG. 1 depicts a system of some embodiments of the present disclosure that utilizes a removable computing device to enable interactions between a mobile computing device and a computing system.

FIG. 1 depicts an example system 100 that enables communications between a mobile computing device and a computing system. The system 100 allows a user associated with the mobile computing device to provide input at the computing system to initiate communications from the mobile computing device or from a user account associated with the mobile computing device, or to receive or respond to communications directed to the mobile computing device or a user account associated with the mobile computing device.

Briefly, the system 100 includes a removable computing device 120, a computing system 130 having an associated display 135, a mobile computing device 110, a server system 150, and a telephony network component 160. The removable computing device 120 may be in communication with each of the computing system 130, the mobile computing device 110, and the server system 150. The mobile computing device 110 can be in communication with a telephony network via the telephony network component 160 and in communication with the server system 150. In some implementations, communications between the server system 150 and each of the mobile computing device 110 and removable computing device 120 can occur over one or more wired or wireless networks 140, such as one or more wired or wireless internet connections. The system 100 can enable communications between the computing system 130 and mobile computing device 110 via the removable computing device 120.

For example, the computing system 130 may be located in a vehicle and can include a touchscreen display 135 in a dash of the vehicle that allows for information to be displayed to a driver of the vehicle or for the driver of the vehicle to enter inputs at the touchscreen display 135. The removable computing device 120 can be electrically connected to the computing system 130 through a data connection port of the vehicle or other connection. The removable computing device 120 can operate to allow communications between the computing system 130 and the mobile computing device 110, which may be associated with the driver (or another rider in the vehicle). When the mobile computing device 110 is proximate to the removable computing device 120 (e.g., because the driver just got in the vehicle), the mobile computing device 110 and the removable computing device 120 can establish a wireless connection that enables the mobile computing device 110 and the computing system 130 to communicate via the removable computing device 120.

When the mobile computing device 110 and the computing system 130 are in communication, the driver can provide inputs at the touchscreen display 135 of the computing system 130 to control the mobile computing device 110 without having to physically interact with the mobile computing device 110. For instance, the driver may be able to enter inputs at the touchscreen display 135 to place or receive calls using the mobile computing device 110, or to initiate, respond to, or otherwise send or receive messages using the mobile computing device 110. Additionally, one or both of the mobile computing device 110 and the removable computing device 120 can access or receive data from the server system 150. The server system 150 may be accessed by the mobile computing device 110 or the removable computing device 120 to send or receive certain types of messages, such as emails or messages between social network users. Additionally or alternatively, the mobile computing device 110 or removable computing device 120 can communicate with the server system 150 to obtain user account information associated with the driver or the mobile computing device 110, including a contact list and associated contact information linked to the user account. The mobile computing device 110 or removable computing device 120 can communicate with the server system 150 to send or receive other information that does not require transmission over a telephony network.

In further detail, the mobile computing device 110 can be any of a number of different types of computing devices, for example, a mobile phone, smartphone, personal digital assistant (PDA), laptop, tablet computer, netbook computer, mobile media player, or other mobile device capable of performing communications at least with a telephony network via the telephony network component 160, and of performing communications with the removable computing device 120, for example, over a wireless or wired data connection. In some implementations, the mobile computing device 110 may be capable of communicating with the server system 150 over the one or more networks 140, such as a wired or wireless internet connection. The mobile computing device 110 typically can have internal or external storage components for storing data and programs such as an operating system and one or more application programs.

In particular, the internal or external storage components for the mobile computing device 110 include applications for establishing a connection to the removable computing device 120 and for communicating over the telephony network via the telephony network component 160. The mobile computing device 110 also includes software for establishing a separate data communication channel with the computing system 130, for example, a Bluetooth connection, Hand-Free Profile (HFP) connection, a Synchronous Connection Oriented (SCO) link, or another connection with the computing system 130 that enables audio data to be communicated between the mobile computing device 110 and the computing system 130. In some implementations, the data communication channel allows for the exchange of voice or video data between the mobile computing device 110 and the computing system 130, but that does not generally permit data other than the voice data or video data to be transmitted directly between the mobile computing device 110 and the computing system 130.

The mobile computing device 110 may be able to access information over the telephony network via the telephony network component 160, and may store the accessed information at the internal or external storage components. That information can include a contact list associated with the mobile computing device 110 or a user account associated with the mobile computing device 110. The contact list can include one or more contacts, where each contact may be associated with information about the contact. In some examples, the contact list may be associated with a user account that is associated with one of the mobile computing device 110 or a user who is associated with the mobile computing device 110. The mobile computing device 110 may be able to access the contact list or user account having an associated contact list at the server system 150 or over the telephony network via the telephony network component 160, and may store the contact list or user account including the contact list at the internal or external storage components of the mobile computing device 110.

The mobile computing device 110 further includes a central processing unit (CPU) for executing instructions stored in storage or received from one or more electronic devices, for example, over the connection to the removable computing device 120, over the one or more networks 140, or over the telephony network via the telephony network component 160. The mobile computing device 110 includes one or more communication interfaces for sending or receiving data, such as one or more antennas, transceivers, network communications cards, or other network adapters capable of transmitting and receiving data over a network, such as the one or more networks 140 or the telephony network, or through a wired or wireless data pathway, such as the connection to the removable computing device 120 or a data communication channel with the computing system 130.

The removable computing device 120 can have any number of different form factors. In some instances, the removable computing device 120 may be designed as a dongle that physically connects to a data communication port of a vehicle, such that the removable computing device 120 may communicate with the computing system 130 through the physical data communication port connection. The removable computing device 120 may have a form factor that permits the removable computing device 120 to connect to the data communication port of the vehicle without affecting a user's ability to access or operate controls near the data communication port to which the removable computing device 120 is connected.

For example, the removable computing device 120 may have a male USB or HDMI connector that is capable of being physically inserted into a corresponding USB or HDMI port of a vehicle that provides a physical connection to the computing system 130. The removable computing device 120 may maintain the connection with the computing system 130 through the USB or HDMI connection based on the male connector of the removable computing device 120 being friction fit into the corresponding port of the vehicle, without the need for wiring between the two devices. The body of the removable computing device 120 can extend from the male connector such that the body of the removable computing device 120 extends outward from the female port of the vehicle. In some instances, the removable computing device 120 may lack a user interface, such as a display or buttons that enable a user to provide input to the removable computing device 120.

The removable computing device 120 typically has internal or external storage components for storing data and programs, such as an operating system and one or more application programs. For instance, the removable computing device 120 may be equipped with software that enables the removable computing device 120 to establish data communication pathways and to communicate with each of the computing system 130 and mobile computing device 110, and in some implementations, with the server system 150 over the one or more networks 140. Additionally, the removable computing device 120 may be equipped with software that permits the removable computing device 120 to determine information to transmit or receive between the mobile computing device 110, computing system 130, and server system 150, for example, for the purposes of sending or receiving data relating to initiating, receiving, or responding to calls or messages directed to the mobile computing device 110 or a user account associated with the computing device 110.

The removable computing device 120 also includes a CPU for executing instructions stored in the internal or external storage of the removable computing device 120, or received by the removable computing device 120 from one or more other electronic devices. For example, the removable computing device 120 can be configured to execute instructions received from the mobile computing device 110 or computing system 130 through the data communication pathways established with those components, or can be configured to execute instructions obtained from the server system 150 over the one or more networks 140.

In some implementations, the removable computing device 120 may be a low-power device that is configured to operate using power provided by a physical electrical connection to the computing system 130. Moreover, in some implementations, the power by the physical connection with the computing system 130 may be augmented or replaced by power provided by a battery that is associated with the removable computing device 120, such as a rechargeable lithium-ion (Li-ion), lithium-ion polymer (Li-ion polymer), nickel cadmium (NiCd), nickel metal hydride (NiMH), or other rechargeable or non-rechargeable battery. In some examples, the removable computing device 120 may be powered without a physical power connection and/or battery, for example, using an induction power system. The removable computing device 120 may be a low-power device that is configured to operate, for example, on currents less than 0.5 Amps.

The removable computing device 120 may be equipped with one or more sensors that are configured to detect information about the removable computing device 120 or components in communication with the removable computing device 120, or to detect information about the environment where the removable computing device 120 is located. For example, the removable computing device 120 may include one or more temperature sensors that enable the removable computing device 120 to adjust its operation based on the surrounding temperature, for instance, to power off the removable computing device 120 in the event of extreme heat (e.g., if the removable computing device 120 is located in a closed vehicle during the summer) or cold. Other sensors may include, for instance, one or more electrical sensors, shock sensors, gyroscopes, wireless signal strength sensors, etc.

To communicate with other devices, such as the mobile computing device 110 and computing system 130, the removable computing device 120 includes one or more wired or wireless connection interfaces. For example, the removable computing device 120 may include a Universal Serial Bus (USB) interface, Bluetooth interface, WI-FI Direct interface, High-Definition Multimedia Interface (HDMI), personal frequency modulation (FM) transmitter, Advanced Technology Attachment (ATA) interface, Near-Field Communication (NFC) interface, Peripheral Component Interconnection (PCI) interface, radio transmitter, or any other antenna, transceiver, network communication card, other network adapter capable of transmitting and receiving data through a wired or wireless data pathway. The removable computing device 120 may be equipped with one or more of these interfaces to enable the removable computing device 120 to communicate with various components. For example, the removable computing device 120 may include a USB interface for establishing a physical connection with the computing system 130 via a data communication port, a Bluetooth interface for wirelessly communicating with the mobile computing device 110, and a WI-FI interface for wirelessly communicating with the server system 150 over the one or more networks 140. In some implementations, the removable computing device 120 may feature components that permit the removable computing device 120 to establish a connection with other devices. For example, the removable computing device 120 may feature a speaker that is capable of emitting an audio signal to permit pairing of the removable computing device 120 and another device using a "whispering" process that is described below.

The computing system 130 can be any of a number of different types of computing systems, such as a mobile or desktop computer, or a computer integrated into a larger system, such as a computer integrated into a vehicle. The computing system 130 may include internal or external storage components for storing data and programs, such as an operating system and one or more application programs. For example, the computing system 130 may store software that enables the computing system 130 to perform various operations with respect to a vehicle in which the computing system 130 is located, for instance, to control a heating, ventilation, and air conditioning (HVAC) system of the vehicle, to control a radio, stereo, or other media system associated with the vehicle, to control a Global Positioning System associated with the vehicle, and to allow for control of the mobile computing device 110 using user inputs to the computing system 130 when the computing system 130 is in communication with the mobile computing device 110 by way of the removable computing device 120.

The computing system 130 may also include a CPU for executing instructions stored in the internal or external storage, or received from one or more other electronic devices such as the removable computing device 120. Similar to the removable computing device 120, the computing system 130 can be associated with one or more wired or wireless interfaces for enabling the computing system 130 to send or receive data. For example, the computing system 130 may be associated with a USB or HDMI port for physically connecting with the removable computing device 120, or can include another interface type that is capable of integrating with the removable computing device 120.

The computing system 130 may have an associated display 135 that is capable of displaying information to a user. Additionally, in some implementations, the display 135 may be a touchscreen display 135 that is capable of detecting user input. The display 135 may feature, for instance, a light emitting diode (LED) display, organic light emitting diode (OLED) display, a liquid crystal display (LCD), Thin-Film-Transistor (TFT) LCD, or may utilize other appropriate display technology, e.g., plasma display panel (PDP) technology. The display 135 may comprise appropriate technology for driving the display 135 to present information to a user, and in some implementations may be capable of detecting user input and converting the user input for submission to the computing system 130 for processing by the computing system 130. The display 135 may be in communication with the computing system 130 over one or more wired or wireless data pathways to enable near area communication between the display 135 and the computing system 130. In some implementations, the display 135 may be affixed in a dash of a vehicle that includes the computing system 130, such that a driver or passenger of the vehicle may view information and provide input at the in-dash display 135.

The server system 150 can be implemented using one or more computing devices, such as one or more servers or computing systems. The one or more computing devices on which the server system 150 is implemented can have internal or external storage components storing data and programs such as an operating system and one or more application programs. The one or more application programs can be implemented as instructions that are stored in the storage components and that, when executed, cause the one or more computing devices to provide the features ascribed herein to the server system 150. Furthermore, the one or more computing devices on which the server system 150 is implemented can include one or more processors for executing instructions stored in storage or, additionally or alternatively, received from one or more other electronic devices, for example, from the mobile computing device 110 or removable computing device 120 over the one or more networks 140. In addition, these computing devices can include network interfaces and communication devices for sending and receiving data.

For example, the server system 150 may be configured to store information associated with one or more user accounts, including a user account associated with the mobile computing device 110 or a user associated with the mobile computing device 110. The mobile computing device 110 or removable computing device 120 can access, e.g., download, the user account information associated with the mobile computing device 110 or user associated with the mobile computing device 110. Additionally or alternatively, the server system 150 may be configured to host one or more email or other electronic messaging accounts, such as messaging accounts associated with a social network. In some implementations, the server system 150 may be capable of providing a Voice Over Internet Protocol (VoIP) interface that allows the user associated with the mobile computing device 110 to perform voice or video data calling with another contact over an internet connection, for example, where the voice or video data transmission occurs as Internet Protocol (IP) packets over a packet-switched network.

The user account may specify information including, by not limited to, information about the user associated with mobile computing device 110, such as their name, user name, age, location, phone number, physical address, email address, an image of the user, interests of the user, employment or education information for the user, a history of communications (e.g., messages) or interactions (e.g., social network interactions) by the user, or other information about the user. The user account may additionally include a contact list that specifies one or more contacts that the user has established in connection with the user account. The contact list may specify information about each of the contacts in the contact list, including one or more of a name of the contact, a phone number for the contact, a user name of the contact, the contact's age, physical address, or email address, a link to a user account associated with the contact, or other information identifying or relating to the contact.

The telephony network component 160 may enable the mobile computing device 110 to exchange data over a telephony network, such as a 3G, 4G, Long-Term Evolution (LTE), Global System for Mobile Communications (GSM), or other telecommunications network. For example, the telephony network component 160 may be a cellular tower, site, Base Transceiver Station (BTS), or other network component that enables the mobile computing device 110 to communicate over the telephony network.

Generally, the telephony network may be a plain old telephone service (POTS) network, a public-switched telephone network (PSTN), a cellular network, a satellite network, an Integrated Services Digital Network (ISDN), a Digital Subscriber Line (DSL) network, or other network that does not utilize Internet Protocol (IP) addressing to identify devices that are in communication.

The one or more networks 140 can include a single network or a combination of networks, such as a local area network (LAN), wide area network (WAN), the internet, analog or digital wired or wireless telephone networks, such as a 4G or LTE network, a satellite network, one or more wireless access points, or any appropriate combination thereof connecting any number of mobile clients, fixed clients, and servers. The one or more networks 140 can enable one or both of the mobile computing device 110 and the removable computing device 120 to connect to the server system 150 and to exchange data with the server system 150. For example, the one or more networks 140 can enable the exchange of user account information, including a contact list, message data, or voice or video data for a VoIP call between the server system 150 and one or more of the computing device 110 and the removable computing device 120.

In practice, the removable computing device 120 and computing system 130 may be in communication through a wireless or wired connection that permits the exchange of data between the removable computing device 120 and computing system 130. Where the connection between the removable computing device 120 and computing system 130 is a physical connection, the connection may be configured such that the removable computing device 120 may be disconnected from the computing system 130. For instance, the removable computing device 120 may be connected to the computing system 130 via a USB connection, such that the removable computing device 120 may be disconnected from the computing system 130. In instances where the computing system 130 is integrated into a larger system, such as a vehicle, the connection between the removable computing device 120 and the computing system 130 may be one that enables the removable computing device 120 to be disconnected from the computing system 130 and removed from the larger system, e.g., taken out of the vehicle having the computing system 130 and used in another vehicle having another computing system. The connection between the computing system 130 and the removable computing device 120 can use one of the wired or wireless network interfaces described above. For example, the removable computing device 120 and computing system 130 may be connected via a USB connection, or may be connected by a Bluetooth connection after the removable computing device 120 and computing system 130 have been paired.

In some implementations, the connection between the computing system 130 and removable computing device 120 may be a connection that does not permit the transfer of audio or video data, such that the connection between the removable computing device 120 and computing system 130 cannot be utilized for the exchange of audio or video data between the computing system 130 and mobile computing device 110. In those implementations, the exchange of audio or video data between the computing system 130 and mobile computing device 110 may occur over a separate voice or video data communication channel, such as an HFP connection.

The removable computing device 120 and mobile computing device 110 may be in communication over a wired or wireless connection such that the removable computing device 120 and mobile computing device 110 can exchange data. The connection between the removable computing device 120 and mobile computing device 110 can utilize an interface mechanisms that is common to both the removable computing device 120 and mobile computing device 110. For example, the removable computing device 120 and mobile computing device 110 may connect via a Bluetooth connection when each of the components is equipped with a Bluetooth interface.

In some implementations, the removable computing device 120 and mobile computing device 110 may communicate through a Bluetooth connection after the mobile computing device 110 and the removable computing device 120 have been paired. In some implementations, pairing of the mobile computing device 110 and removable computing device 120 is achieved by a "whispering" process. The "whispering" process uses an audio signal emitted by a device to allow the device and another device to automatically pair with one another without user input. For example, a removable computing device 120 in a vehicle can emit an audio signal that can be detected by other devices. When a user having a smartphone enters the vehicle, the user's smartphone can detect the audio signal, and can use the audio signal to identify and pair with removable computing device 120 automatically and without the user having to interact with either their smartphone or the removable computing device 120.

In further detail, the removable computing device 120 encodes an address that identifies the removable computing device 120 in an audio signal, and outputs the audio signal by way of a speaker associated with the removable computing device 120. In some implementations, the address may be encoded in a high-frequency audio signal, such that the frequency of the audio signal encoding the address is outside of the range of human hearing. For the mobile computing device 110 to pair with the removable computing device 120, the mobile computing device 110 may be configured to detect the audio signal encoding the address. The mobile computing device 110 may then decode the audio signal to obtain the address encoded in the audio signal. The mobile computing device 110 can transmit the decoded address to a server, such as the server system 150 or a server accessible over the telephony network by way of the telephony network component 160, where the decoded address can be used to identify the removable computing device 120. The mobile computing device 110 can receive information from the server system 150 or over the telephony network that identifies the removable computing device 120, and using the received information identifying the removable computing device 120 can pair with the removable computing device 120 to establish a wireless communication channel with the removable computing device 120.

The "whispering" process may be accomplished in a variety of ways. For example, in an alternate embodiment, the mobile computing device 110 may record the detected audio signal emitted by the removable computing device 120 and may transmit the recorded audio signal to another computing system for decoding. For example, the mobile computing device 110 may transmit the recorded audio signal to the server system 150 or other server accessible to the mobile computing device 110. The audio signal may be decoded remotely from the mobile computing device 110 to determine the address, and the decoded address used to identify the removable computing device 120. The mobile computing device 110 may then receive the information identifying the removable computing device 120, and may utilize the received information identifying the removable computing device 120 to establish the connection with the removable computing device 120.

Figure 2A:
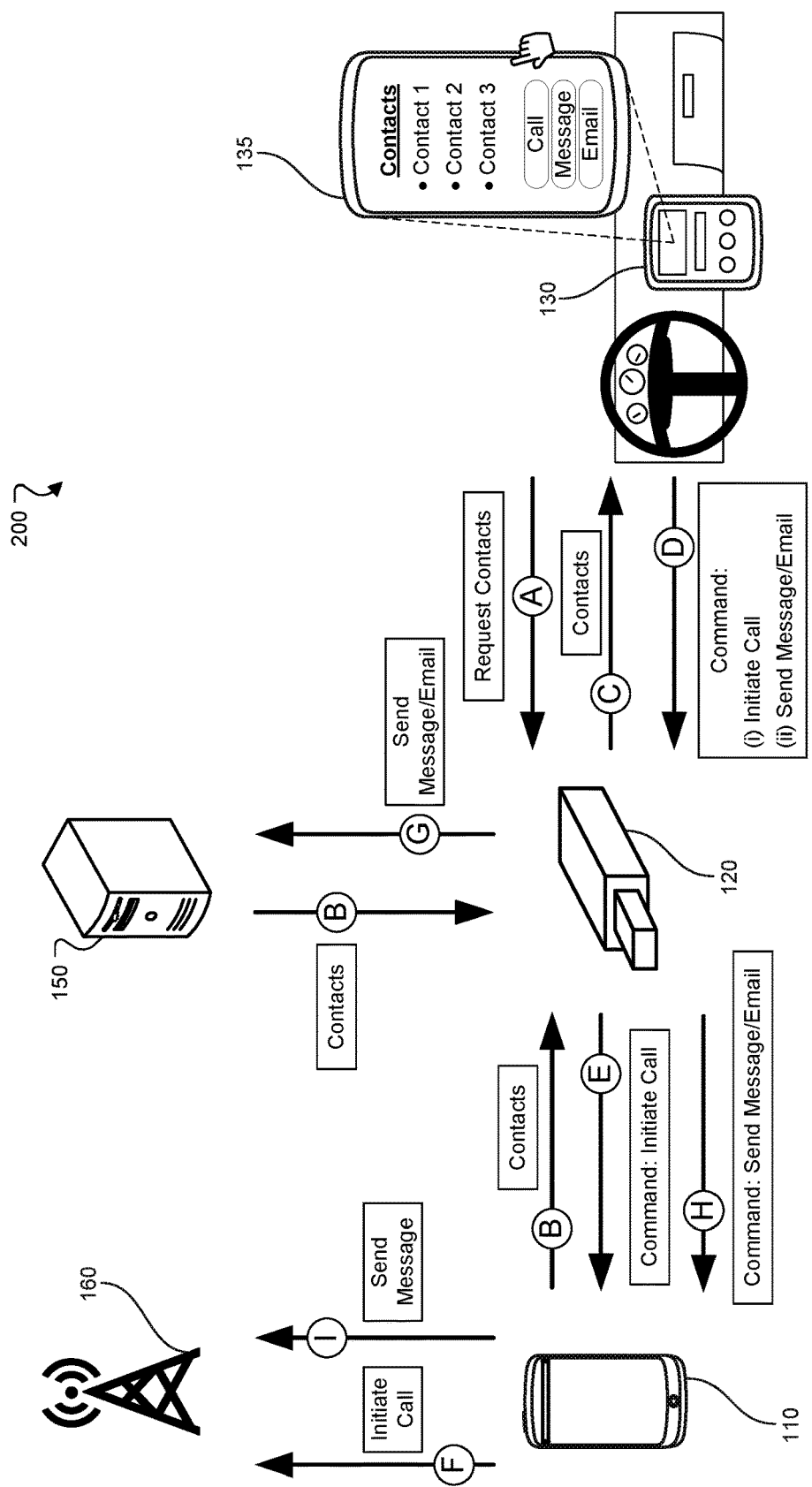
FIG. 2A depicts a system of some embodiments of the present disclosure for initiating telephone calls or sending messages.

FIG. 2A illustrates a system 200 of some embodiments of the present disclosure that utilizes a removable computing device to initiate telephone calls or to send messages. For example, FIG. 2A may describe a scenario in which a user having a smartphone is driving a vehicle that includes a vehicle computing system. The vehicle computing system and the user's smartphone can communicate by way of the removable computing device. The communication can enable the vehicle computing system to present information to the user that is typically only available to the user at their smartphone, such as the user's contacts, messages, emails, or other information. The communication between the vehicle computing system and smartphone that is enabled by the removable computing device can allow the user to initiate calls or send messages while driving by interacting with the vehicle computing system instead of their smartphone.

The system 200 shown in FIG. 2A comprises components described in reference to FIG. 1, including a removable computing device 120 that is in communication with each of a computing system 130, a mobile computing device 110, and a server system 150. The computing system 130 has an associated display 135 for displaying information. In some implementations, the computing system 130 may be in a vehicle and may enable a user to interact with various components or perform various functions relating to operation of the vehicle. The mobile computing device 110 is in communication with a telephony network component 160 of a cellular network.

The removable computing device 120 is communicatively coupled to the computing system 130 through a wired or wireless connection. For example, the removable computing device 120 may be insertable into a data communication port associated with the computing system 130, where the data communication port may be in a vehicle and the computing system 130 is included in the vehicle. Alternatively, the removable computing device 120 may be in communication with the computing system 130 using one or more other wired or wireless connections, such as a Bluetooth or WI-FI connection. The removable computing device 120 and the mobile computing device 110 are in communication over one or more wireless communications, such as a Bluetooth, WI-FI, near field communication (NFC), or other wireless connection. In some implementations, the removable computing device 120 and the mobile computing device 110 are paired devices such that the removable computing device 120 and the mobile computing device 110 establish a communication channel automatically and without user input, for example, by automatically establishing a Bluetooth connection between the devices when the devices are proximate to one another. The removable computing device 120 may be in communication with the server system 150 over one or more wired or wireless connections. For instance, the removable computing device 120 may be equipped with a radio transceiver that enables the removable computing device 120 to communicate with the server system 150 over a cellular network, or may be equipped with other components that enable the removable computing device 120 to send and receive data from the server system 150. The mobile computing device 110 in communication with the telephony network component 160 using a radio transceiver included in the mobile computing device 110.

At step (A) the computing system 130 requests contact information by transmitting a request for contacts to the removable computing device 120. For example, the computing system 130 may request contact information associated with any mobile computing device that is in communication with the removable computing device 120, may request contact information associated with a particular mobile computing device, may request contact information associated with a particular user account that is associated with a user of a particular mobile computing device, or may request other contact information. In some implementations, the computing system 130 may request the contact information based on determining that the removable computing device 120 has been communicatively coupled to the computing system 130, may request the contact information continuously or periodically when the removable computing device 120 is connected to the computing system 130, may request the contact information in response to user input at the display 135 of the computing system 130, or may request the contact information based on other events, for example, based on the removable computing device 120 providing an indication to the computing system 130 that the mobile computing device 110 has established a connection with the removable computing device 120.

In response to the request for contact information, at step (B) the removable computing device 120 requests contact information from the mobile computing device 110 or the server system 150, and in response obtains contact information that identifies one or more contacts from either the mobile computing device 110 or the server system 150.

For example, when the mobile computing device 110 is in communication with the removable computing device 120, the removable computing device 120 may request the contact information from the mobile computing device 110, and in response the mobile computing device 110 may transmit contact information to the removable computing device 120. The contacts provided to the removable computing device 120 may be identified by contact information stored at the mobile computing device 110, for example, contacts that a user of the mobile computing device 110 has stored at the mobile computing device 110. Alternatively, if the mobile computing device 110 is associated with a user account corresponding to a user of the mobile computing device 110, the mobile computing device 110 may provide contacts to the removable computing device 120 that are associated with the user account.

Additionally or alternatively, the removable computing device 120 can receive the contact information from the server system 150. For example, the server system 150 may store contacts for a user account associated with a user. The user may be a user associated with the mobile computing device 110 that is in communication with the removable computing device 120, may be a user that is associated with a vehicle having the computing system 130, or may be a user that has been identified to the removable computing device 120, for example, through user preferences or settings of the removable computing device 120. In some examples, the user preferences or settings may specify that the removable computing device 120 should obtain contact information for specific users when the removable computing device 120 is in a particular location, on a particular day or at a particular time, or may specify that the removable computing device 120 should otherwise obtain contacts that are associated with a particular user account. For example, a user may be able to establish preferences or settings for the removable computing device 120 indicating that the removable computing device 120 should obtain contacts associated with a first user account when the removable computing device 120 or computing system 130 are located in a first geographical area, and should obtain contacts associated with a second user account when the removable computing device 120 or computing system 130 are located in a second, different geographical area.

In some implementations, contact information obtained by the removable computing device 120 may identify the names of one or more contacts, as well as related information for those contact. For example, each contact may be associated with a name, a phone number, an email address, an IP address or user account identifier (e.g., a username), a business or group that the contact is associated with, an image associated with the contact, or other information associated with the contact.

Upon receiving the contact information that specifies the contacts, the removable computing device 120 may provide the information identifying the contacts to the computing system 130 at step (C) for display at the display 135 of the computing system 130. For example, the computing system 130 may receive data identifying three contacts, namely "Contact 1", "Contact 2", and "Contact 3", and may present the display shown in FIG. 2A that provides options for a user to select one of the contacts and to perform operations with respect to the contacts. Such options may include placing a telephone call to a selected contact, sending an email to a selected contact, or sending a text message or other message to a selected contact. Other options may also be presented to a user at the display 135, for example, options to initiate a video conference with a selected contact, to perform a social media interaction with a selected contact, to modify or delete a contact, or to take other actions.

A user associated with the mobile computing device 110 who has access to the display 135 of the computing system 130 may provide input at the display 135 to provide a command. For example, a driver of a vehicle having the computing system 130 whose mobile computing device 110 is in communication with the removable computing device 120 can select a particular contact and select a "Call", "Message", or "Email" command. In response, the computing system 130 can transmit the command to the removable computing device 120 at step (D). In some examples, the driver can select a particular contact and a particular command using a number of techniques, such as by selecting the contact and command from a touchscreen device, speaking the contact's name and the command when the computing system 130 has voice detection capabilities, or using other techniques. Similarly, if the driver selects a "message" or "email" command, the driver may enter content of the message by typing or speaking the message content such that the computing system 130 can determine the message content and transmit the message content to the removable computing device 120.

Steps (E) and (F) describe the operations of the system 200 when the command input by a user is to place a telephone call to a particular contact selected by the user from the display 135. In these instances, the removable computing device 120 controls the mobile computing device 110 to initiate a telephone call using the cellular communication capabilities of the mobile computing device 110. At step (E), the removable computing device 120 receives the command to initiate a telephone call to a particular contact selected by a user from among the contacts presented at the display 135, and as a result provides a command to the mobile computing device 110 to initiate a telephone call to the selected contact. For instance, the removable computing device 120 may transmit information to the mobile computing device 110 that identifies the selected contact, and that further includes a command for the mobile computing device 110 to initialize a telephone call to the selected contact.

At step (F), the mobile computing device 110 receives the command from the removable computing device 120 to initiate the telephone call to the selected contact, and in response initiates the telephone call to the selected contact. For example, the mobile computing device 110 receives information identifying contact selected by a user from the display 135 and the command to initiate a call to the selected contact, and initiates the telephone call by placing a telephone call to the selected contact through the telephony network component 160. Thus, since placing a telephone call requires the use of a cellular or similar voice network, and since the computing system 130 and removable computing device 120 may lack connections to the cellular or similar voice network (or may have them but the system is configured to use a cellular account of the mobile computing device 110), the removable computing device 120 operates to control the mobile computing device 110 to place a telephone call to the contact selected at the display 135 of the computing system 130.

Steps (G), (H), and (I) describe operations of the system 200 when the command input by a user at the display 135 is a command to send a message, such as a text message, email, or other message, to a selected contact. Depending on the type of message or the configuration of the system 200, the removable computing device 120 may transmit the message to the selected contact by transmitting the message to the server system 150, or the removable computing device 120 may transmit the message and a command to transmit the message to the selected contact to the mobile computing device 110 such that the mobile computing device 110 may then transmit the message to the selected contact. A user may input a message to send to a contact by selecting a particular contact from the display 135 and selecting an option to send a message or email to the selected contact. The user may then input a message to send to the selected contact by, for example, typing the message at a touch screen or keyboard associated with the display 135, or by speaking the message such that the spoken message can be detected by a microphone associated with the computing system 130 and transcribed to obtain message text.

When the computing system 130 receives the user input by detecting speech of the user, the computing system 130 obtains a transcription of the user's speech to determine the command input by the user and the message content input by the user. In some implementations, the computing system 130 may include a speech recognizer that utilizes one or more language models to transcribe the user's speech. Alternatively, the computing system 130 may lack capabilities to transcribe the speech, and may therefore rely on a transcription obtained from a speech recognizer located elsewhere. For example, the computing system 130 may transmit the received audio data including the user's speech to the removable computing device 120. The removable computing device 120 may include a speech recognizer that can transcribe the speech and return a transcription of the speech to the computing device 130. Alternatively, the removable computing device 120 may submit the received audio data to a speech recognizer that is accessible by the removable computing device 120, such as at the server 150 or mobile computing device 110, to obtain a transcription of the user's speech that the removable computing device 120 can then return to the computing system 130 for processing.

Step (G) describes an implementation wherein the removable computing device 120 transmits the message to the selected contact by transmitting the message to the server system 150 such that the selected contact may receive the message from the server system 150. For example, if the selected contact is an email contact, a short messaging service (SMS) contact, a contact having a user account that is capable of receiving messages (e.g., a social network account), or a user associated with an Internet Protocol (IP) address, then the message may be transmitted a server system 150 and received by the recipient contact via the server system 150, for example, by accessing their email at the server system 150, accessing their SMS or other messages from the server system 150. In these instances, the removable computing device 120 can transmit the message data to the server system 150 over its connection with the server system 150, for example, over a WI-FI connection that provides access to the server system 150 (possibly independent of communication with the mobile computing device 110).

Steps (H) and (I) describe an implementation wherein the removable computing device 120 issues a command to the mobile computing device 110 to send a message to a contact selected by a user. For example, in some implementations a message to be transmitted to a selected contact uses a mobile messaging service (MMS) format, or the removable computing device 120 may be unable to access the server system 150. In these instances, the removable computing device 120 may transmit the message content, data identifying the contact selected by the user, and a command to send the message content to the identified contact to the mobile computing device 110 (step (H)).

At step (I), the mobile computing device can receive the message content, the data identifying the contact, and the command to transmit the message content to the contact, and in response the computing device 110 can send a message including the message content to the identified contact. The mobile computing device 110 can transmit the message over a cellular network or other telephone network by transmitting the message to the identified contact through the telephony network component 160 in a similar fashion as to how the mobile computing device 110 initiates a telephone call. Such a method may be used when the message is a MMS message that utilizes such a cellular network or other telephone network.

Alternatively, the mobile computing device 110 may have a connection to the server system 150, and may transmit the message to the server system 150 over one or more network connections, such as through the telephony network component 160, or through another data connection to the server system 150, such as a WI-FI connection. Such a method may be utilized by the mobile computing device 110 when the message to be transmitted to the contact is an SMS message, an email message, a message to a contact associated with an IP address, a user account (e.g., social network account) of the contact, or is otherwise a message that can be accessed by the recipient contact at the server system 150.

Figure 2B:
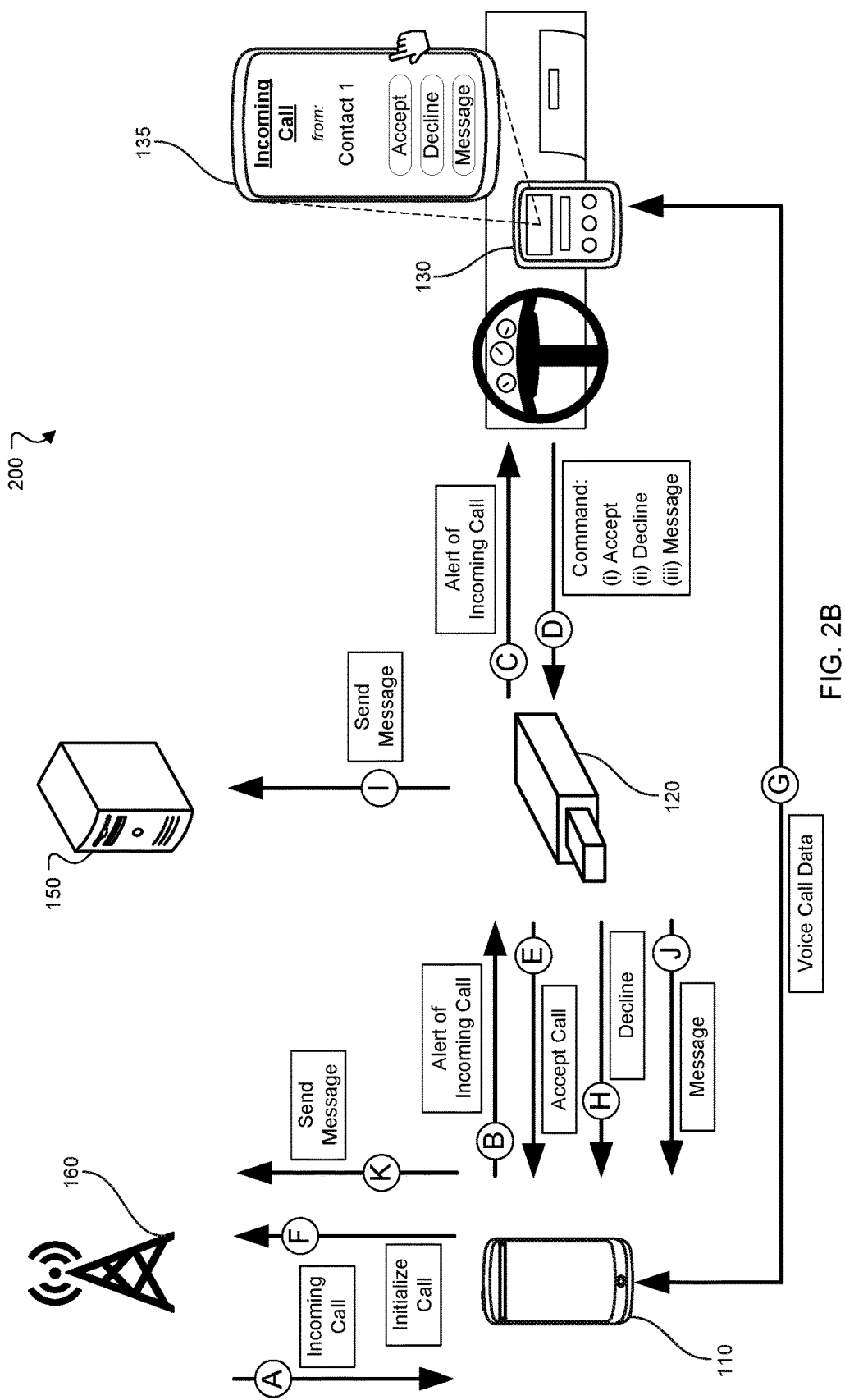
FIG. 2B depicts a system of some embodiments of the present disclosure for responding to a telephone call received by a mobile computing device.

FIG. 2B depicts the example system 200 when the system 200 responds to an incoming telephone call received by a mobile computing device. For example, FIG. 2B may describe a scenario when a user having a smartphone is driving a vehicle that includes a vehicle computing system. The vehicle computing system and the smartphone may be in communication via a removable computing device. While driving, the user's smartphone can receive a call or message, and notification of the call or message can be presented to the user at a display of the vehicle computing system. Additionally, instead of having to handle their smartphone to answer the call or respond to the message, the user can provide input to the vehicle computing system that can be transmitted to the smartphone using the removable computing device to control the smartphone to respond to the call or message.

The system 200 includes a removable computing device 120, computing system 130, mobile computing device 110, server system 150, and telephony network component 160 as described with respect to FIG. 1. The removable computing device 120 is in communication with each of the computing system 130, the server system 150, and the mobile computing device 110 as discussed with respect to FIG. 2. The computing system 130 has an associated display 135 that provides an interface for user input. The mobile computing device 110 is in communication with a cellular network or other telephone network via the telephony network component 160.

At step (A) of FIG. 2B, the mobile computing device 110 receives an incoming call. The incoming call may be received by the mobile computing device 110 from the telephony network component 160 over the cellular network or other telephone network. Alternatively, in some implementations, the telephone call may be a voice data call, such as a voice over Internet Protocol (VoIP) call, that is received by the mobile computing device 110 over one or more networks from, for example, the server system 150, the telephony network component 160, or through another connection to the Internet, such as a WI-FI connection. Additionally, in those implementations where the call is a VoIP call, the call may be received by the removable computing device 120, for example, from the server system 150 or from another system that the removable computing device 120 is in communication with over one or more data connections. For instance, if the VoIP call is directed to a user identity or account of a user associated with the mobile computing device 110, the server system 150 may receive the indication of the initiated call, and the removable computing device 120 may receive an indication of the call from the server system 150.

The incoming telephone call received by the mobile computing device 110 may include or be accompanied by data relating to the telephone call. For example, the incoming telephone call may be accompanied by information identifying who initiated the telephone call, for example, information specifying a telephone number that initiated the telephone call, a location associated with the incoming telephone call, such as a location associated with a particular area code of the telephone number, information specifying whether the telephone call is a local or long distance call, or other information. Similarly, if the incoming call is a VoIP call, the information accompanying the incoming telephone call may include a location where the call was initiated, a user identifier or account that initiated the call, whether accepting the incoming call would incur charges, or may include other information.

After receiving the incoming telephone call (or VoIP call), at step (B) the mobile computing device 110 transmits an alert to the removable computing device 120 that indicates there is an incoming call. For example, the mobile computing device 110 may transmit an indication to the removable computing device 120 of the incoming telephone call received by the mobile computing device 110, and may further transmit to the removable computing device 120 at least a portion of the information relating to the incoming call that is received by the mobile computing device 110. For example, the alert transmitted to the removable computing device 120 may be accompanied by information identifying the caller that placed the call to the mobile computing device 110, information identifying a location associated with the caller, or with other information. In some instances, the caller that initiated the call with the mobile computing device 110 may be a caller that is also associated with a contact that is known by the mobile computing device 110. In those instances, information identifying the contact or information associated with that contact, such as an image associated with the contact, may also be transmitted to the removable computing device 120 to identify the caller.

The removable computing device 120 receives the alert of the incoming call and any information accompanying the incoming call, and at step (C) the removable computing device 120 can transmit the received information to the computing system 130. For instance, based on receiving information indicating that a call is being initiated with the mobile computing device 110, and information identifying a phone number of the caller that initiated the call, the removable computing device 120 can transmit information to the computing system 130 that includes the alert of the incoming call, and that further includes the information identifying the caller. In some examples, the removable computing device 120 may transmit only a portion of the information received from the mobile computing device 110 to the computing system 130. For example, if the removable computing device 120 receives information including an alert of an incoming call, an identifier of the caller, and a location associated with the caller that initiated the call, the removable computing device 120 may determine to transmit only an alert of the incoming call and information identifying the caller to the computing system 130.

The computing system 130 can receive the information from the removable computing device 120 and can output at least a portion of the received information at the display 135 of the computing system 130. For example, the computing system 130 may receive an alert of an incoming call, information identifying the caller, and information identifying a location associated with the caller, and in response the computing system 130 can present on the display 135 an indication that there is an incoming call and information identifying the caller, as shown in the display 135 of FIG. 2B. The computing system 130 can further control the display 135 to present one or more options for responding to the incoming call. For example, as shown in FIG. 2B, the display 135 presents user-selectable options to accept the incoming call, to decline the incoming call, or to decline the incoming call but respond to the incoming call with a message. In some implementations, the computing system 130 may, in addition to outputting the information at the display 135, provide other indications of the incoming call, for example, by controlling a speaker associated with the computing device to play a sound or ring tone to alert users of the incoming call.

In response to outputting the information and alerts relating to the incoming call, the computing system 130 can receive user input that commands the system 200 to respond to the incoming call in a specific way. For example, the computing system 130 can receive a user input indicating that a user has elected to accept the call, decline the call, or to decline the call and respond to the call with a message. The user input can be received by the computing system 130 in response to a user, such as a driver of a vehicle having the computing system 130, providing an input to a touchscreen or keyboard associated with the display 135. Additionally, if the user selected an option to decline the call and to respond to the caller that initiated the call with a message, the computing system 130 may additionally receive message content to include in the message response. The message content may be textual content that was typed by a user using a touchscreen of the display 135 or a keyboard associated with the computing system 130, or may be textual information that was determined by transcribing a voice input by the user.

At step (D) the computing system 130 provides information indicating the selected response to the incoming call to the removable computing device 120. For example, the computing system 130 may provide information to the removable computing device 120 that includes a command to answer the incoming call, to decline the incoming call, or to decline the incoming call and to reply to the incoming call with a message. If the user has elected to decline the call and to respond to the caller who initiated the call with a message, the information transmitted from the computing system 130 to the removable computing device 120 may further include information relating to the reply message, for example, the textual message content obtained by the computing system.

The removable computing device 120 receives the information from the computing system 130. Steps (E) through (K) describe operations of the system 200 depending upon the command input by the user and detected by the computing system 130. Depending upon the command received by the computing system 130, the removable computing device 120 may provide commands or other information to the mobile computing device 110 or to the server system 150.

Steps (E) through (G) describe an implementation when the removable computing device 120 receives a command to accept the incoming call. Based on receiving this indication from the computing system 130, the removable computing device 120 provides a command to the mobile computing device 110 during step (E) to accept the incoming call. The mobile computing device 110 can receive the instruction from the removable computing device 120, and in response to receiving the instruction, can perform operations during step (F) to accept the incoming call. For example, the mobile computing device 110 can transmit information to the telephony network component 160 to accept the incoming call.

Additionally, to accept the incoming call, at step (G) the mobile computing device can establish a communication channel with the computing system 130 to allow for an exchange of voice data between the computing system 130 and the mobile computing device 110. For example, the mobile communication device 110 may establish a Bluetooth, HFP connection, a Synchronous Connection Oriented (SCO) link, or another connection with the computing system 130 that enables audio data to be communicated between the mobile computing device 110 and the computing system 130. For example, the mobile computing device 110 can receive audio data associated with the call from the telephony network component 160, and may transmit the audio data to the computing system 130 over the established audio data communication channel. The computing system 130 may then output the audio data received from the mobile computing device 110 using a speaker associated with the mobile computing device 110. Similarly, the computing system 130 may have an associated microphone that can receive audio data from a user participating in the call, and can transmit the audio data to the mobile computing device 110 over the established audio data communication channel. The mobile computing device 110 can receive the audio data and can transmit the audio data to the telephony network component 160. In this way, once the incoming call has been accepted, a user can participate in the call via the computing system 130 without having to interact with the mobile computing device 110, i.e., in a hands-free manner. Such an implementation is useful especially for implementations in which the removable computing device 120 is not capable of sending or receiving audio data.

Step (H) describes an implementation in which the removable computing device 120 has received a command from the computing system 130 to decline the incoming call. In this instance, the removable computing device 120 can transmit a command to the mobile computing device 110 to decline the incoming call at the mobile computing device 110. The mobile computing device 110 can receive the command to decline the incoming call, and can perform operations to decline the incoming call. For example, the mobile computing device 110 can perform operations at the mobile computing device 110 to decline the incoming call, or can in some implementations transmit information to the telephony network component 160 (not shown) that causes the mobile computing device 110 to terminate the incoming call.

Steps (I) through (K) illustrate operations performed by the system 200 in instances where a user has provided a command in response to an alert of an incoming call to decline the incoming call and to reply to the incoming call with a message. The command to decline the message and reply with a message is similar to the operations described with respect to step (H) of FIG. 2B above and with respect to steps (G) through (I) of FIG. 2A. At step (I) of FIG. 2B, if the message to be transmitted in response to the incoming call is a message that can be transmitted by the removable computing device 120, the removable computing device 120 can transmit information to the server system 150 that causes a message to be sent to the caller who initiated the incoming call. For example, the removable computing device 120 may have received information at step (B) that identifies the caller who initiated the call, and may have received information from the computing system 130 at step (D) that includes message content to include in a reply message to the caller. The removable computing device 120 can transmit information to the server system 150 in a similar method as described with respect to step (G) of FIG. 2A to cause a message that includes the message content to be sent to the caller who initiated the incoming call. Additionally, at step (J), the removable computing device 120 can transmit information to the mobile computing device 110 that instructs the mobile computing device 110 to decline the incoming call using a method similar to that discussed with respect to step (H).

Alternatively, if the removable computing device 120 is not capable of sending the message in reply to the incoming call, for example, if the reply message is sent using a MMS format, then at step (J) the removable computing device 120 can transmit information to the mobile computing device 110 that includes a command to decline the incoming call, a command to send a reply to the caller who initiated the call, and the message content specified by the user who selected the option to decline the incoming call and reply with a message. For example, the information transmitted by the removable computing device 120 to the mobile computing device 110 at step (J) can include a command for the mobile computing device 110 to decline the incoming call in a manner similar to that discussed with respect to step (H). Additionally, the information can include a command for the mobile computing device 110 to transmit a message, and can include the message content provided by the user to the computing system 130.

In such an implementation, the mobile computing device 110 can receive the commands and the message content from the removable computing device 120, and can operate to decline the incoming call and to send a message to the caller who initiated the incoming call. For example, the mobile computing device 110 can decline the incoming call according to the method described with respect to step (H). The mobile computing device 110 can also be aware of the identity of the caller who initiated the incoming call, for example, based on the call information received at step (A) from the telephony network component 160 or the server system 150. Therefore, at step (K), the mobile computing device 110 can send a message to the caller who initiated the incoming call using methods similar to those discussed with respect to step (I) of FIG. 2, and can include in the message the message content received from the removable computing device 120.

Figure 2C:
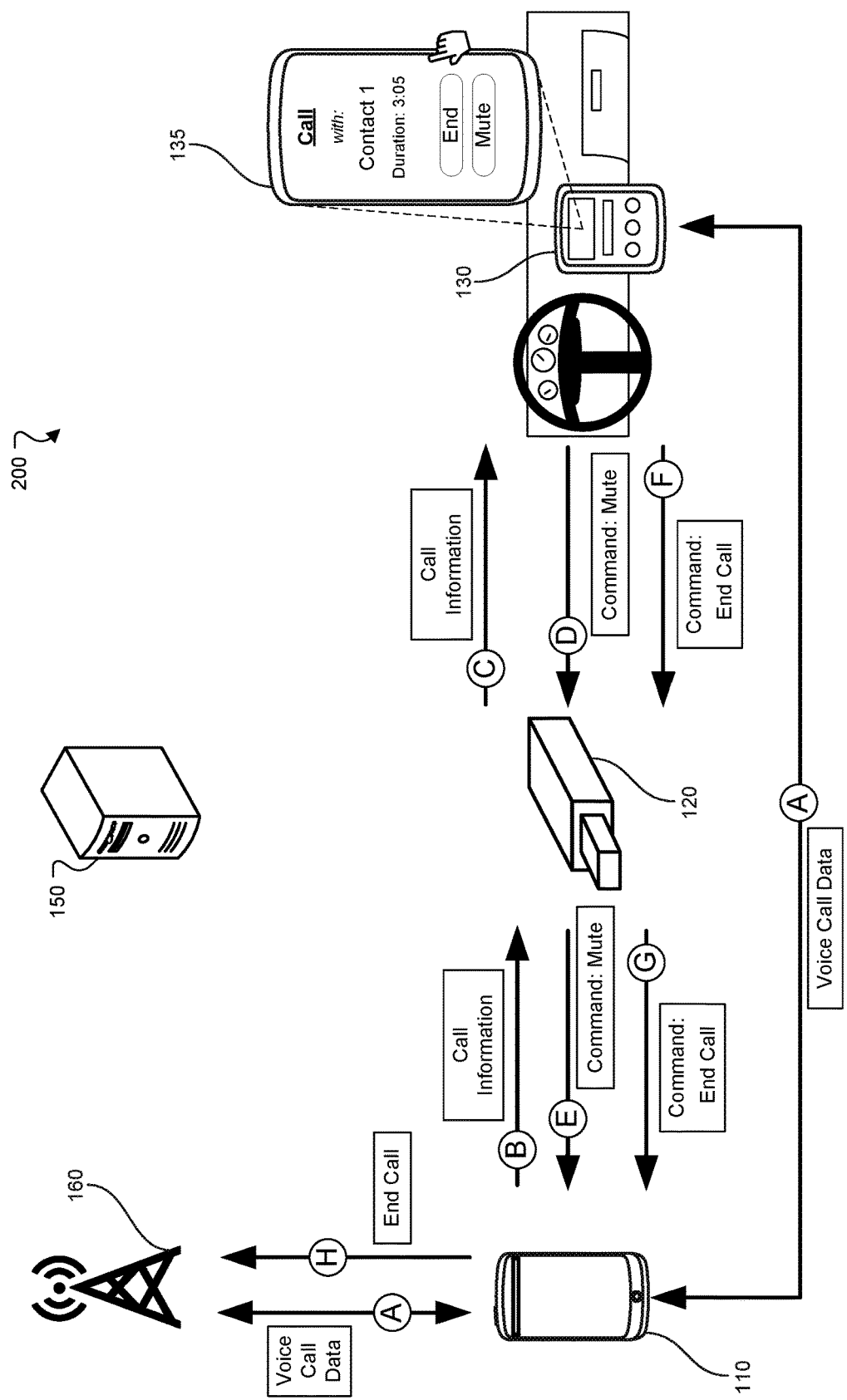
FIG. 2C depicts a system of some embodiments of the present disclosure for interacting with a mobile computing device during a telephone call.

FIG. 2C depicts the example system 200 when the system 200 is configured to enable a user to interact with a mobile computing device during a telephone call. For example, a user having a smartphone can be driving a vehicle that includes a vehicle computing system, where the smartphone and vehicle computing system are in communication via a removable computing device. The user can be engaged in a call, and may want to control aspects of the call while they are driving, for example, to mute the call. The connection between the vehicle computing system and the smartphone through the removable computing device can enable the user to provide input to the vehicle computing system to control aspects of the call without having to interact with their smartphone to do so.

The system 200 of FIG. 2C includes a removable computing device 120, a computing system 130 associated with a display 135, a mobile computing device 110, a server system 150, and a telephony network component 160. The removable computing device 120 is in communication with each of the computing system 130, the server system 150, and the mobile computing device 110. For example, the removable computing device 120 may be in communication with the mobile computing device 110, server system 150, and computing system 130 as described with respect to FIG. 2. Additionally, the mobile computing device 110 is in communication with a cellular or other telephone network via the telephony network component 160.

At step (A), a telephone call is in progress and a voice data communication channel has been established between the mobile computing device 110 and the computing system 130 to enable the exchange of voice data associated with the telephone call. The connection between the mobile computing device 110 and the computing system 130 may be a wireless connection such as a Bluetooth, HFP, SCO link, or another wireless communication channel that is capable of carrying audio data. The audio data communication channel may have been established in response to a user associated with the mobile computing device 110 initiating a call, in response to a user of another device accepting a call initiated by the user associated with the mobile computing device 110, or in response to the user associated with the mobile computing device 110 accepting a call initiated with the mobile computing device 110.

At step (B) the mobile computing device 110 can determine call information relevant to the ongoing call, and can transmit at least a portion of the call information to the removable computing device 120. For example, the mobile computing device 110 may determine call information including a duration of the call, whether the call is a local or long distance call, a location of the mobile computing device 110 during the call or a location of the other device participating in the call, or other information. In some examples, the mobile computing device 110 may determine that the other device that the mobile computing device 110 is engaged with in the call is associated with a contact known to the mobile computing device 110, and the mobile computing device 110 can include at least a portion of the contact information in the call information.

The removable computing device 120 can receive the call information transmitted by the mobile computing device 110, and at step (C) can transmit at least a portion of the received call information to the computing system 130. For example, the removable computing device 120 can receive the call information, and can determine that at least a portion of the call information is information that may be displayed at the display 135 associated with the computing system 130. The removable computing device 120 can transmit the portion of the call information that it determines may be displayed at the display 135 to the computing system 130. For example, when the removable computing device 120 is in communication with the computing system 130 via a data communication port of a vehicle that includes the computing system 130, the removable computing device 120 can transmit the portion of the call information to the computing system 130 through the data communication port of the vehicle.

The computing system 130 can receive the call information transmitted by the removable computing device 120, and can determine to display some or all of the call information at the display 135 associated with the computing system. For example, the computing system may receive call information that indicates a current duration of the call, a contact that the phone call is being held with, and a location of the contact's device, and may determine to display only the call duration information and the identity of the contact. The computing system 130 can control the display 135 to display the information, for example, as shown in FIG. 2C, that the current call duration is three minutes and five seconds (3:05) and that the call is with "Contact 1".

Additionally, the computing system 130 can present one or more input controls at the display 135 that are each associated with a user-selectable command. The user-selectable commands may include commands to control aspects of the telephone call. For example, the computing system 130 can control the display 135 to display an option to "End" the call or an option to "Mute" the call. In some examples, additional or different options for user-selectable controls may be presented at the display 135 by the computing system 130. For example, options may be presented to initiate a conference call with one or more additional callers, to return to a "home" screen on the display 135, to record a call, to add a caller as a contact, to forward a call to voicemail, or to perform other operations.

A user may provide an input to the computing system 130 to select a particular user-selectable control. For example, the display 135 may be associated with a touchscreen or a keyboard such that a user may provide an input to the computing system 130 by interacting with the touchscreen or keyboard. The computing system 130 may determine that the user has selected the particular option associated with the particular user-selectable control. In response, the computing system 130 can determine how to process the particular user-selectable command.

For example, steps (D) and (E) describe an instance in which a user has selected an option to "Mute" the call. For example, a driver of a vehicle having the mobile computing device 110 can select an option at a touchscreen of the display 135 to "Mute" a call that is in progress with "Caller 1", and the computing system 130 can receive the user selection of the "Mute" command. In some implementations, selection of the "Mute" option can cause the system 200 to stop detecting audio from the audio input device of the system 200, e.g., a microphone of the computing system 130, such that speech or other audio from the environment of the user is not heard by the other user on the call. At step (D), the computing system 130 receives the indication that the user has selected the "Mute" command and transmits data to the removable computing device 120 that includes a command directed to the computing device 110 to "Mute" the call. For example, when the removable computing device 120 is in communication with the computing system 130 by way of a data communication port, the computing system 130 can transmit the data including the "Mute" command to the removable computing device 120 through the data communication port connection.

At step (E), the removable computing device 120 receives the data including the "Mute" command from the computing system 130, and transmits data including the "Mute" command to the mobile computing device 110. The mobile computing device 110 can receive the data including the "Mute" command and can perform operations to mute the in-progress call. For example, after processing the received data to determine the "Mute" command, the mobile computing device 110 can cause the microphone of the mobile computing device 110 to stop receiving audio data, can cause the mobile computing device 110 to temporarily stop receiving audio data from the computing system 130 over the audio data communication channel, can cause the mobile computing system 110 to temporarily stop transmitting audio data received over the audio data communication channel to the telephony network component 160 or, if the call is a VoIP call, to the server system 150, or can otherwise perform operations to "Mute" the call, for instance, by discarding audio data received from the computing system 130 over the voice data communication channel, or can otherwise perform operations to "Mute" the call. For instance, the mobile computing device 110 can mute the call by transmitting information to the computing system 130 via the removable computing device 120 to deactivate the microphone associated with the computing system 130. The mobile computing device 110 may maintain the "Mute" status of the call until the mobile computing device 110 receives an "Unmute" command, until the call has been terminated, for a predetermined period of time, or can determine to terminate the "Mute" status based on other factors.

Steps (F), (G), and (H) describe an example when a user provides a command to "End" a call that is in progress. For example, a driver of a vehicle having the mobile computing device 110 can select an option at a touchscreen of the display 135 to "End" a call that is in progress with "Caller 1". The "End" command may be a command to terminate the call that is in progress. The computing system 130 can receive the selection of the "End" command, and can transmit data to the removable computing device 120 indicating a command directed to the mobile computing device 110 to "End" the call. For example, when the removable computing device 120 is in communication with the computing system 130 by way of a data communication port, the computing system can transmit the data indicating the "End" command to the removable computing device 120 through the data communication port connection.

The removable computing device 120 receives the data including the "End" command from the computing system 130, and transmits data including the "End" command to the mobile computing system 110. For example, when the mobile computing device 110 and the removable computing device 120 are in communication over a wireless connection, such as a Bluetooth connection, NFC connection, or other wireless connection, the mobile computing device 110 can receive the data indicating the "End" command from the removable computing device 120, and can process the "End" command to terminate the call in progress.

At step (H), the mobile computing device 110 performs operations terminate the call in response to the "End" command. For example, the mobile computing device 110 can transmit data to the telephony network component 160 to terminate the call. Additionally, in some implementations, the mobile computing device 110 can terminate the audio data communication channel with the computing system 130 in response to the "End" command. In this way, the mobile computing device 110 can end the audio data communication channel with the computing system 130, while maintaining communications with the computing system over the data connection path through the removable computing device 120. Other operations may be performed by the system 200 to terminate the call or in response to terminating the call. For example, the mobile computing device 110 may transmit information to the computing system 130 via the removable computing device 120 to close the voice data communication channel, or can transmit information to the computing system 130 via the removable computing device 120 that indicates that the call has been terminated. The computing system 130 can receive such information and in response can terminate the voice data communication channel or can display information at the display 135 that indicates that the call has been terminated.

Figure 2D:
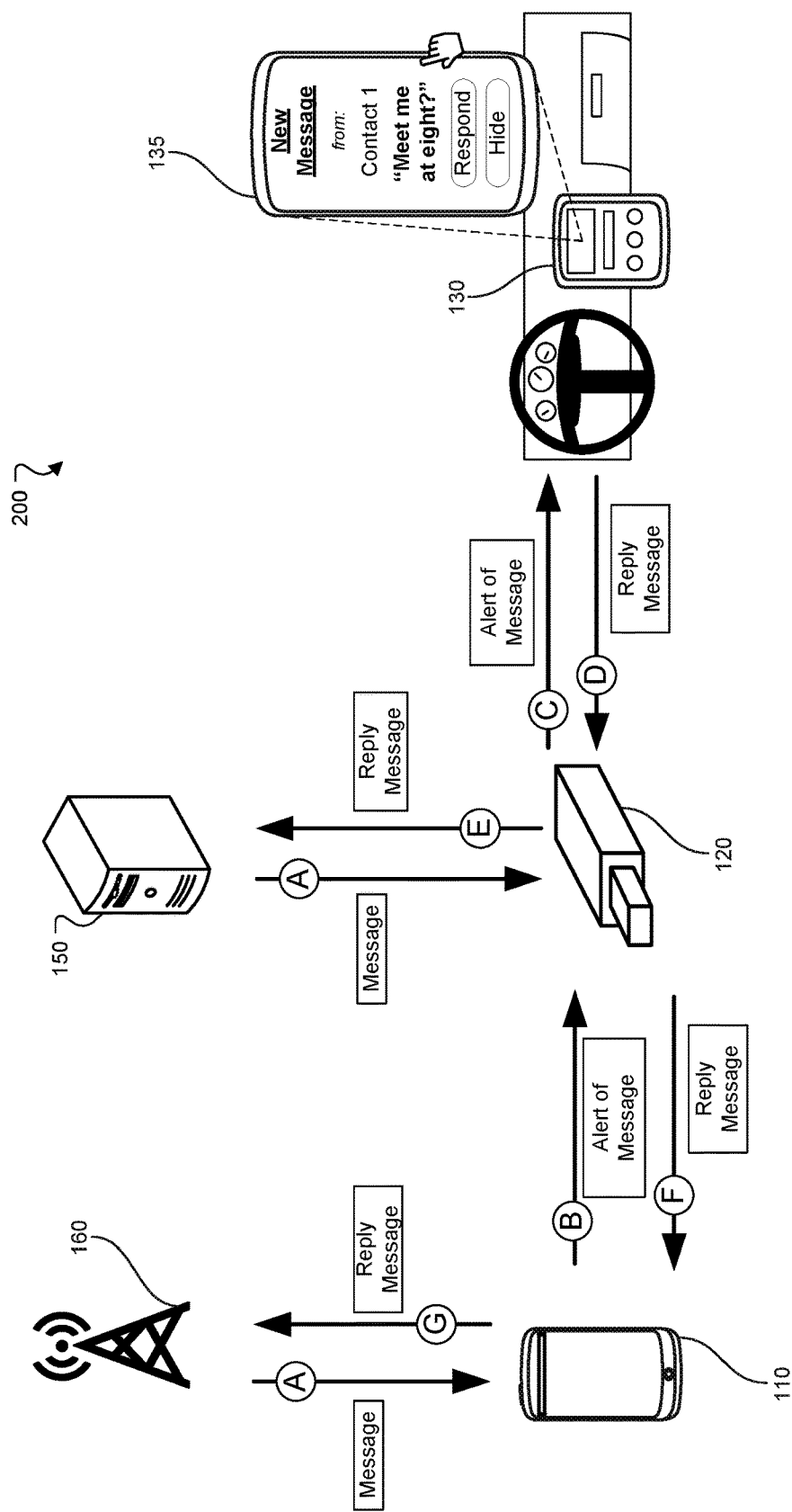
FIG. 2D depicts a system of some embodiments of the present disclosure for responding to a message received by a mobile computing device or by a user account associated with a user of the mobile computing device.

FIG. 2D depicts the example system 200 when the system 200 is configured to enable a user to receive and respond to messages received by a mobile computing device without having to interact directly with the mobile computing device. For example, a smartphone belonging to a user who is driving a vehicle can receive a message at their smartphone, and based on the smartphone having a connection to a vehicle computing system of the vehicle through a removable computing device, the message may be automatically presented to the user at a display of the vehicle computing system. The user may be able to respond to the message by interacting with the vehicle computing system of the vehicle such that a reply can be sent to the incoming message without the driver having to interact with their smartphone.

The system 200 of FIG. 2D includes a removable computing device 120, a computing system 130 having an associated display 135, a mobile computing device 110, a server system 150, and a telephony network component 160. The removable computing device 120 is in communication with each of the computing system 130, the server system 150, and the mobile computing device 110. For instance, the removable computing device 120 may be in communication with the mobile computing device 110, server system 150, and computing system 130 as described above with respect to FIG. 2. Additionally, the mobile computing device 110 is in communication with a cellular or other telephone network via the telephony network component 160.

At step (A), the mobile computing device 110 receives a message. For example, as shown in FIG. 2D, the mobile computing device 110 receives the message from the telephony network component 160. Alternatively, the mobile computing device 110 may receive the message from the server system 150. For example, if the message is an MMS message, email, or other message that is processed at the server system 150 and if the mobile computing device 110 has a connection to the server system 150, such as a WI-FI connection that allows the mobile computing device 110 to receive the message from the server system 150 over the Internet, then the mobile computing device 110 may receive the message from the server system 150. The received message may any of an SMS message, MMS message, email, a message sent through a social networking service (e.g., between user accounts of two social network users), a voicemail message, or other textual or multimedia message.

In response to receiving the message, at step (B) the mobile computing device 110 can transmit an alert to the removable computing device 120 that indicates that the mobile computing device 110 has received a message. In some implementations, the information transmitted to the removable computing device 120 by the mobile computing device 110 can include additional information relating to the received message. For example, the information associated with the alert of the received message may include information about the received message, such as information identifying the sender of the message, a time when the message was received, how many messages have been received, the content of the received message, a type of the received message, such as whether the received message was an SMS message, MMS message, email, or other message (e.g., a message received through a social networking service).

In some implementations, the mobile computing device 110 may determine that the sender of the message corresponds to a contact that is known to the mobile computing device 110. Upon determining that the sender of the message corresponds to a known contact, the mobile computing device 110 can include information with the message alert that specifies the contact or information associated with the contact, such as an image of the contact, a name of the contact, a location associated with the contact, etc.

The removable computing device 120 can receive the information transmitted by the mobile computing device 110, and at step (C) can transmit an alert of the received message to the computing system 130. For example, the removable computing device 120 can receive the information including the alert of the received message, and other information related to the received message, and can transmit all or a portion of the received information to the computing system 130. In some implementations, the removable computing device 120 can determine which of the received information can or will be displayed at the display 135 associated with the computing system 130, and may determine to transmit only that data that will be displayed at the display 135 to the computing system 130. For example, the removable computing device 120 may receive information that includes an alert of the received message, a name of a contact who sent the message, the textual content of the message, and a time the message was received, and may determine to only transmit an alert of the received message, a name of the contact who sent the message, and the textual content of the message to the computing system 130. Thus, the removable computing device 120 may determine not to transmit information indicating the time the message was received, based on, for example, determining that the time the message was received would not be displayed at the display 135 of the computing system 130.

The computing system 130 receives the information from the removable computing device 120, and controls the display 135 to output information related to the received message. For example, based on receiving the alert of the received message, the computing system 130 can cause the display 135 to output an alert of the received message. The computing system 130 may additionally cause other information related to the received message to be output at the display 135. For example, based on receiving information including an alert of the received message, a name of a contact who sent the message, and the message content, the computing system 130 may cause the display 135 to output the received information. As shown in FIG. 2D, for example, the display 135 can indicate that the mobile computing device 110 has received a message from "Contact 1" that says "Meet me at eight?".

The computing system 130 may additionally cause the display 135 to present user-selectable options for responding or acting on the received message. For example, as shown in FIG. 2D, the computing system 130 can cause the display 135 to provide user-selectable options to "Respond" to the message, or to "Hide" the alert relating to the received message. A user may select the "Respond" option, for example, by clicking on the user-selectable icon associated with the "Respond" option that is displayed at the display 135, to enter a message in response to the received message. A user may select the "Hide" option by clicking on the user-selectable icon associated with the "Hide" option that is displayed at the display 135, to dismiss the alert relating to the received message. Additional or different user-selectable options may also be presented with the received message. For example, the computing system 130 may provide user-selectable options at the display 135 to respond to the message by calling the sender, to save the received message, to add a sender of the message to a set of contacts, or to perform other operations.

The computing system 130 can determine that a user has selected a particular option in response to the message alert, and can perform operations in response to the user selection. For example, based on determining that a user has selected a user-selectable icon for the "Hide" option, the computing system 130 may control the display 135 to return to a home screen of the display, or to otherwise remove the alert of the message from the display 135. In response to determining that a user has selected a user-selectable icon for the "Respond" option, the computing system 130 may provide an interface for a user to enter a reply message. For instance, a user may be able to enter a reply message using a touchscreen of the display 135 or a keyboard associated with the computing system 130. Alternatively, the user may be able to enter a reply message by speaking the reply into a microphone associated with the computing system 130, such that the computing system 130 can transcribe the spoken input to obtain reply message text.

If the user entered a "Respond" option, then at step (D) the computing system 130 can receive the reply message content and can transmit the reply message content to the removable computing device 120. For example, based on a user selecting the "Respond" option at the display 135 and then providing a speech input, the computing system 130 can transcribe the speech input to obtain the content of the reply message, and can transmit information to the removable computing device 120 that includes the reply message content. In some implementations, the reply message may be of the same format or type as the message received by the mobile computing device 110. For example, if the originally received message was an SMS message, then the computing system 130 may prepare the reply message as an SMS message as well. In other implementations, the received message and the reply message may be of different formats. For example, the mobile computing device 110 may receive an SMS message, and the computing system 130 may utilize an MMS message format for the reply message. In some implementations, the data transmitted to the removable computing device 120 may include additional information. For example, the computing system 130 may specify the format of the reply message, such as whether the message is an SMS message, MMS message, email, etc., may include data indicating the size of the message, e.g., in terms of number of characters or data size, or may include other information with the reply message content.

The removable computing device 120 can receive the data from the computing system 130. Step (E), (F), and (G) describe how the reply message may be sent to the sender of the original message. Step (E) describes the operation of one implementation of the system 200 when the reply message is one that can be transmitted to the sender via the server system 150. For example, if the reply message is an MMS message, an email, a message through a social networking service, or another message that utilizes non-telephonic communications, i.e., that identifies contacts using IP addresses or other identifiers other than telephone numbers, then the removable computing device 120 may transmit the reply message to the server system 150 to respond to the message received by the mobile computing device 110. In some examples, the removable computing device 120 may be capable of sending a reply message to the sender via the server system 150 based on the removable computing device 120 having received information from the mobile computing device 110 that is required to send the reply message to the sender. For example, the mobile computing device 110 may provide information to the removable computing device 120 that indicates an IP address, email address, or other identifier of the sender of the initial message received by the mobile computing device 110. The removable computing device 120 may utilize this received information to transmit the reply message to the sender.

Alternatively, if the reply message cannot be transmitted to the sender via the server system 150, then at step (F) the removable computing device 120 may transmit data including the reply message to the mobile communication device 110. For example, if the reply message to the sender of the message received by the mobile computing device 110 is an SMS message, then the reply message may not be capable of being sent to the sender by the removable computing device 120 via the server system 150, but may be sent to the sender by the mobile computing device 110 via the telephony network component 160. Therefore, the removable computing device 120 may transmit data including the content of the reply message to the mobile computing device 110.

In other instances, the removable computing device 120 may transmit the data to the mobile computing device 110 to enable the mobile computing device 110 to send the reply message based on the removable computing device 120 determining that the mobile computing device 110 is better suited or equipped for sending the reply message. For example, even if the removable computing device 120 may be able to send the reply message to the sender via the server system 150, if the mobile computing device 110 is determined to have a network connection that would enable for the reply message to be sent more efficiently to the sender by the mobile computing device 110 than the removable computing device 120, then the removable computing device 120 may determine to send the reply message to the mobile computing device 110. The information transmitted to the mobile computing device 110 may include content of the reply message, and may optionally include additional information relating to the reply message, as described previously, including information indicating a length or size of the reply message, or other information.

The mobile computing device 110 can receive the information transmitted by the removable computing device 120, and at step (G) can transmit the reply message to the sender of the message initially received by the mobile computing device 110. For example, as shown at FIG. 2D, the mobile computing device 110 can transmit the reply message to the sender via the telephony network component 160. Alternatively, the mobile computing device 110 may send the reply message to the sender by way of the server system 150, for example, if the mobile computing device 110 received the initial message from the sender by way of the server system 150, if the mobile computing device 110 has a data connection to the server system 150, or if the format of the reply message is capable of transmission to the sender via the server system 150. In some examples, the mobile computing device 110 may be aware of information required to send a message to the sender, such as a phone number or IP address, based on the received message, and can send the reply message to the sender based on the information.

Figure 3:
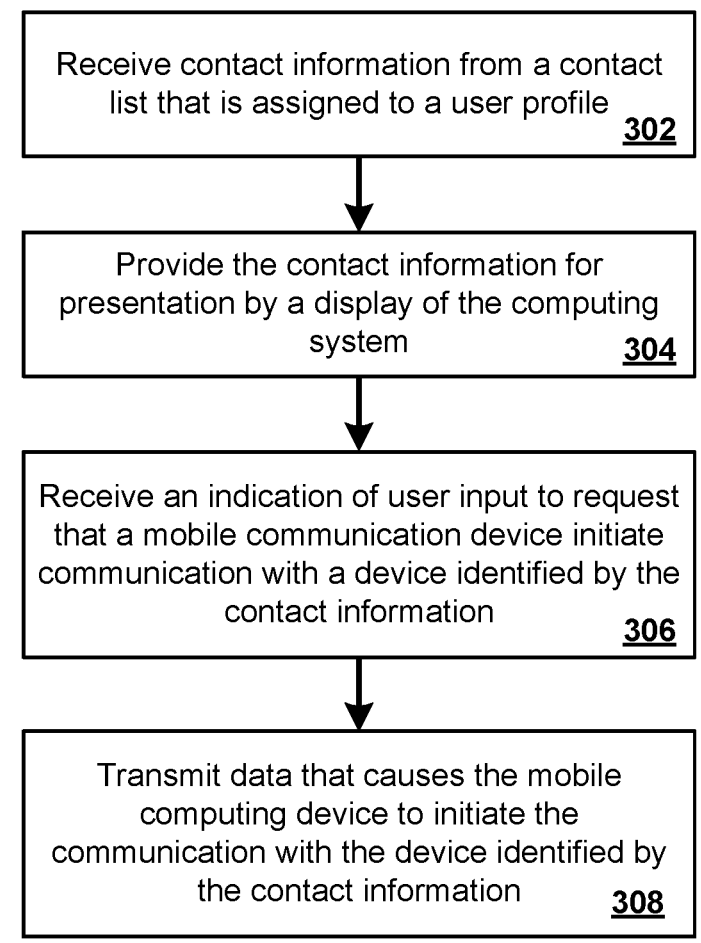
FIG. 3 is a flowchart of an example process that can be executed in accordance with implementations of the present disclosure.

FIG. 3 depicts an example process 300 that utilizes a removable computing device to enable communications between a mobile computing device and a computing system, such that a user associated with the mobile computing device can provide input at the computing system to cause the mobile computing device to initiate communications. In some implementations, the process 300 may be performed by the system 100 of FIG. 1, for example, the removable computing device 120, mobile computing device 110, and computing system 130. In some examples, the computing system 130 may be located in a vehicle, and the process 300 may enable a user associated with the mobile computing device 120 to initiate communications by interacting with the computing system 130 instead of interacting with the mobile computing device 110.

According to one implementation of the process 300, a removable computing device that is electrically connected to a computing system through a physical connection receives contact information from a contact list that is assigned to a user account (302). The user account is associated with a mobile computing device that is in wireless communication with the removable computing device. The removable computing device is configured to physically disconnect from the computing system.

For example, the removable computing device 120 of the system 100 can be electrically connected to the computing system 130 of the system 100 through a physical connection. The physical connection may be, for example, by way of a data communication port of a vehicle that includes the computing system 130, such that the data communication port allows for an electrical connection between the removable computing device 120 and the computing system 130. Moreover, the removable computing device 120 may be configured to physically disconnect from the computing system 130. For example, the removable computing device 120 may be a dongle that electrically connects to the computing system 130 by way of a data communication port that is associated with the computing system 130, such that the physical connection between the removable computing device 120 and computing system 130 is not permanent, but rather permits the removable computing device 120 to be disconnected from the computing system 130.

The removable computing device 120 can receive contact information from a contact list that is assigned to a user account, wherein the user account is associated with the mobile computing device 110 that is in wireless communication with the removable computing device 120. For example, the mobile computing device 110 may be associated with a particular user having a user account, and the contact information received by the removable computing device 120 may be contact information that is selected from a contact list that is assigned to the user account. The contact list assigned to the user account may include one or more contacts that the user has established, where each of the contacts in the contact list may be associated with information about the contact. For example, each contact in the contact list may be associated with one or more of a name, a phone number, an email address, a location, an image, a company or employer, a physical address, a ring tone, one or more notes that the user associated with the user account has entered about the contact, or other information. The contact information received by the removable computing device 120 may include all or a portion of the contact information associated with one or more of the contacts in the contact list associated with the user account.

In some implementations, the removable computing device 120 may receive the contact information over the wireless communication link with the mobile computing device 110. In other implementations, the removable computing device 120 may be in communication with the server system 150 over one or more networks, or one or more wired or wireless connections, and the removable computing device 120 may receive the contact information from the server system 150. For example, the removable computing device 120 may determine a user account associated with the mobile computing device 110 that the removable computing device 120 is in communication with, and may receive contact information from a contact list associated with the user account that is associated with the mobile computing device 110.

In some implementations, the removable computing device 120 may be in wireless communication with mobile computing deice 110. For example, upon the removable computing device 120 and the mobile computing device 110 being sufficiently close to one another, such as within a range that permits Bluetooth, NFC, or other short-range wireless communications between the devices, the removable computing device 120 and the mobile computing device 110 may establish a wireless Bluetooth, NFC, or other short-range wireless communication connection. In some examples, as described previously, the removable computing device 120 and mobile computing device 110 may be paired devices, wherein the pairing permits the wireless communication link to be established between the devices. For instance, the removable computing device 120 and mobile computing device 110 may have been previously paired, such that the removable computing device 120 and the mobile computing device 110 establish the wireless communication link upon the removable computing device 120 and mobile computing device 110 coming within range of one another to permit the wireless communication. Additionally or alternatively, as described with respect to FIG. 1, the removable computing device 120 and mobile computing device 110 may establish wireless communications based on performing a "whispering" process.

The removable computing device provides the contact information for presentation by a display of the computing system (304). For example, the removable computing device 120 may provide the computing system 130 with at least a portion of the contact information received by the removable computing device 120. The removable computing device 120 may provide the contact information to the computing system 130 using the electrical connection that exists between the removable computing device 120 and the computing system 130. In some instances, the removable computing device 120 may transmit all of the received contact information to the computing system 130, or may transmit only a portion of the received contact information to the computing system 130. The computing system 130 may have an associated display 135 that is capable of displaying information. In some implementations, the display 135 may also be capable of receiving user inputs, for example, when the associated display 135 is a touchscreen. The computing system 130 can receive the contact information from the removable computing device 120, and can present at least a portion of the received contact information at the display 135.

The removable computing device receives, from the computing system, an indication of user input received by the computing system to request that the mobile computing device initiate communication with a device that is identified by the contact information (306). For example, a user can provide input to a touchscreen or keyboard associated with the computing system 130, where the input can indicate a request for the mobile communication device 110 to initiate a communication with a contact identified by the contact information. In some implementations, the display 135 may be a touchscreen display, such that the user input may be received by the computing system 130 from the display 135. The user input may specify at least a contact and a type of communication to initiate with a device associated with the contact. For example, the user input may specify a particular contact from the contact list associated with the user account, wherein the particular contact is a contact that was identified by the contact information received by the computing system 130 from the removable computing device 120. Additionally, the user input may specify a communication to initiate with the device of the contact. For example, the user input may indicate a request to initiate a call with the device associated with the contact, to initiate a message to the device associated with the contact, or to initiate another type of communication with the device associated with the contact.

The computing system 130 may transmit data to the removable computing device 120 that specifies the device associated with the contact and the requested communication to initiate with the device associated with the contact. For example, the computing system 130 may transmit information to the removable computing device 120 over the physical connection between the computing system 130 and the removable computing device 120. The information may request the particular type of communication be initiated with the device associated with the contact selected from among the one or more contacts presented as options at the display 135, where the one or more contacts presented as options at the display 135 were specified by the contact information received by the computing system 130 from the removable computing device 120.

The removable computing device transmits data for receipt by the mobile computing device that causes the mobile computing device to initiate the communication with the device that is identified by the contact information (308). For example, the removable computing device 120 can wirelessly transmit data to the mobile computing device 110 that causes the mobile computing device 110 to initiate the requested communication with the device that is associated with the contact selected by the user.

In some implementations, the requested communication may be a call to the device associated with the selected contact, such that the mobile computing device 110 can receive the data from the removable computing device 120 and can initiate a call to the device associated with the selected contact. The call may be placed by the mobile computing device 110 to the device associated with the selected contact over a wireless telephone network, such as a cellular telephone network, via the telephony network component 160, or can be placed over a data communication channel, for example, via the one or more networks 140 if the call is a VoIP call. Alternatively, the requested communication may be a message to be sent to the device associated with the selected contact. Depending upon the format of the message, such as a whether the message is a SMS message, MMS message, email, message through a social networking service, etc., the mobile computing device 110 may transmit the message over the wireless telephone network via the telephony network component 160, or can transmit the message to the device associated with the selected contact over the one or more networks 140.

Additionally, when the requested type of communication for the mobile computing device 110 to initiate is a message, the computing system 130 may also receive user input that specifies content of the message. For example, the user may type the message content at a touchscreen or keyboard associated with the computing system 130, or the message content may be transcribed from a speech input of the user that is detected by the computing system 130. The computing system 130 can transmit the message content to the removable computing device 120, for example, over the physical connection between the computing system 130 and removable computing device 120. The removable computing device 120 can then send the message content to the mobile computing device 110, for example, over the wireless connection between those two components of the system 100. The mobile computing device 110 can then transmit the message content to the device associated with the selected contact.

Figure 4:
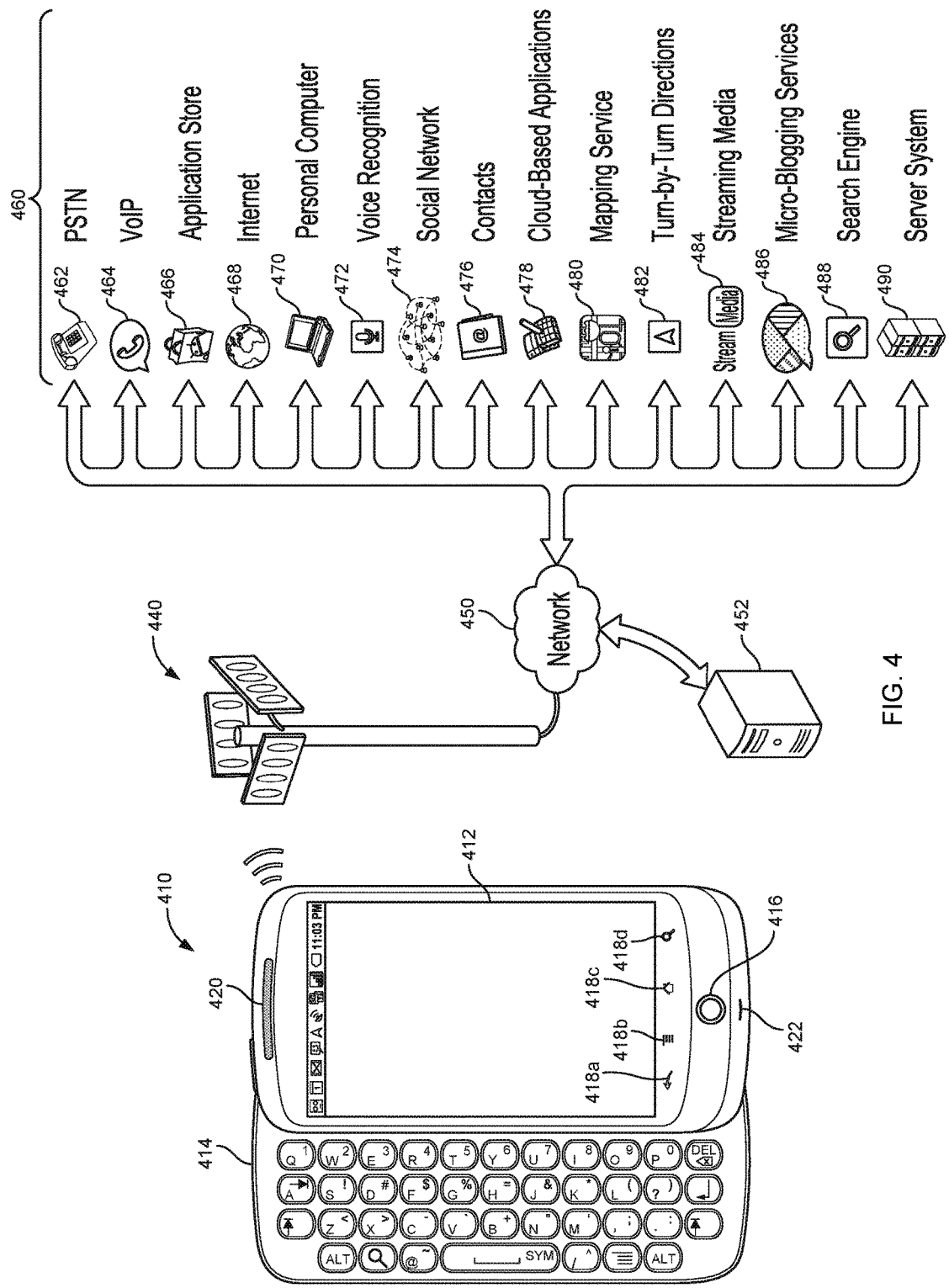
FIG. 4 depicts an example mobile computing device in accordance with implementations of the present disclosure.

Referring now to FIG. 4, a conceptual diagram of a system that may be used to implement the systems and methods described in this document is illustrated. In the system, mobile computing device 410 can wirelessly communicate with base station 440, which can provide the mobile computing device wireless access to numerous hosted services 460 through a network 450.

In this illustration, the mobile computing device 410 is depicted as a handheld mobile telephone (e.g., a smartphone, or an application telephone) that includes a touchscreen display device 412 for presenting content to a user of the mobile computing device 410 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 414, physical buttons, trackballs, accelerometers, gyroscopes, and magnetometers).

Example visual output mechanism in the form of display device 412 may take the form of a display with resistive or capacitive touch capabilities. The display device may be for displaying video, graphics, images, and text, and for coordinating user touch input locations with the location of displayed information so that the device 410 can associate user contact at a location of a displayed item with the item. The mobile computing device 410 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 414, which may be a full qwerty keyboard or a traditional keypad that includes keys for the digits '0-9', '*', and '#.' The keyboard 414 receives input when a user physically contacts or depresses a keyboard key. User manipulation of a trackball 416 or interaction with a track pad enables the user to supply directional and rate of movement information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" graphical user interface that is displayed after turning on the mobile computing device 410, after activating the mobile computing device 410 from a sleep state, after "unlocking" the mobile computing device 410, or after receiving user-selection of the "home" button 418c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 410 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 410 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 410. The mobile device 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., ETHERNET, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computing systems that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing systems associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call using a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

" Determining" by a computing system can include the computing system requesting that another device perform the determination and supply the results to the computing system. Moreover, "displaying" or "presenting" by a computing system can include the computing system sending data for causing another device to display or present the referenced information.

Figure 5:
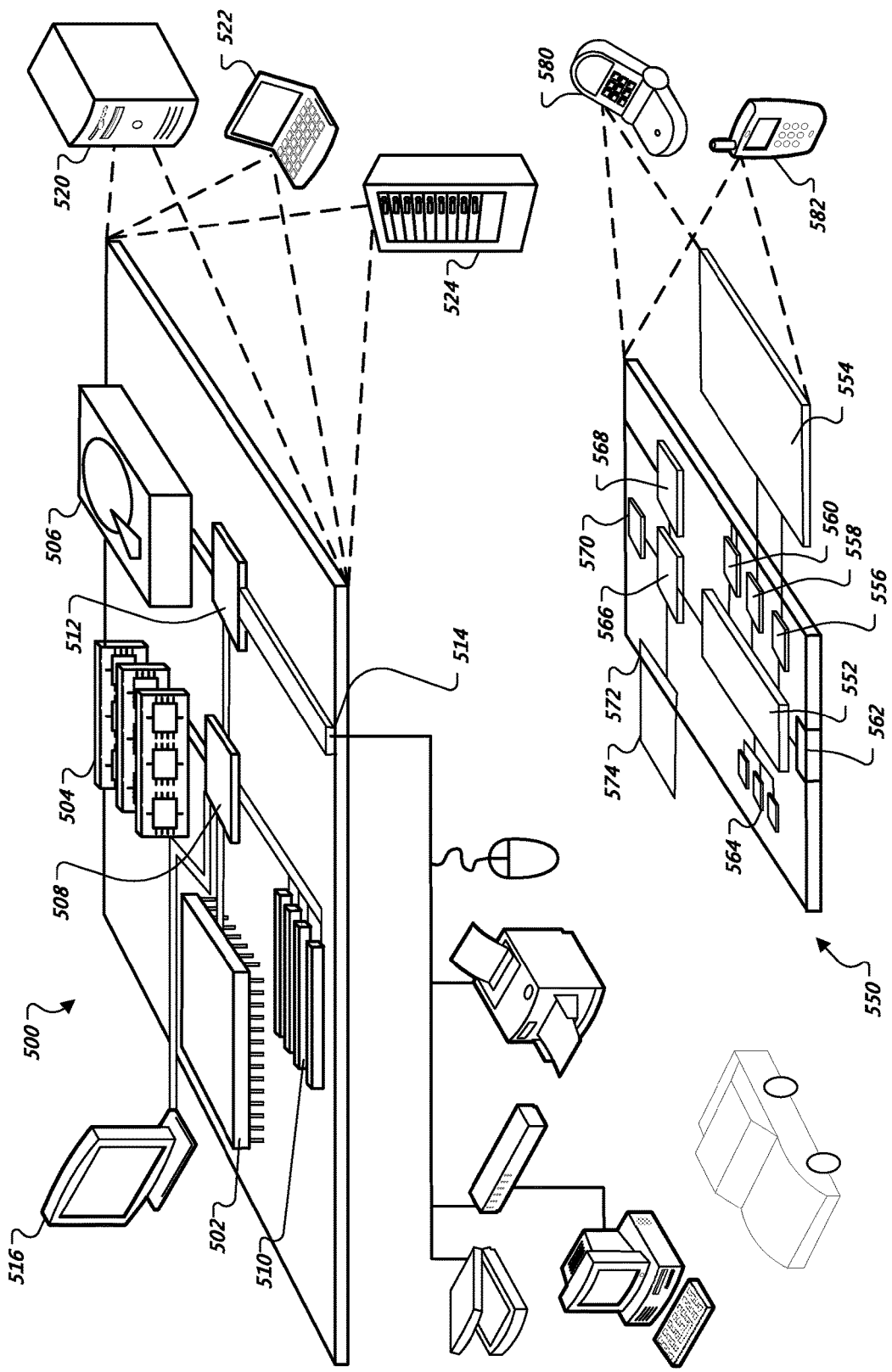
FIG. 5 depicts an example computing system in accordance with implementations of the present disclosure.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be in communication with processor 552, so as to enable near area communication of device 550 with other devices. External interface 562 may provided, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

The invention claimed is:

1. A computer-implemented method comprising:
receiving, by a removable computing device that is electrically connected to a computing system through a physical connection, contact information from a contact list that is assigned to a user account, wherein:
the user account is associated with a mobile computing device that is in wireless communication with the removable computing device;
the removable computing device is (i) insertable into a data communication port of the computing system, (ii) configured to maintain the physical connection through a friction fit with the data communication port of the computing system, (iii) equipped with software that enables the removable computing device to wirelessly communicate with the mobile computing device and to communicate with the computing system through the data communication port, and (iv) configured to physically disconnect from the computing system; and the contact information is wirelessly received by the removable computing device through a wireless communication from the mobile computing device or from a server system and includes, for one or more contacts, information for initiating communication with a contact device associated with the contact;

providing, by the removable computing device and to the computing system, at least a portion of the contact information for presentation by a display of the computing system;

receiving, by the removable computing device and from the computing system, an indication of user input received by the computing system to request that the mobile computing device initiate communication with a contact device of a selected contact that is identified by the contact information; and transmitting, by the removable computing device for receipt by the mobile computing device, data that causes the mobile computing device to initiate the communication with the contact device of the selected contact that is identified by the contact information.

2. The computer-implemented method of claim 1, wherein:
the computing system is a computing system installed in a vehicle;
the removable computing device is a computerized dongle; and
the mobile computing device is a smartphone.

3. The computer-implemented method of claim 1, wherein:
the contact information includes a telephone number; and
the communication that the mobile computing device initiates with the contact device of the selected contact that is identified by the contact information is a telephone call with the contact device that is identified by the telephone number.

4. The computer-implemented method of claim 3, wherein the data that causes the mobile computing device to initiate the communication is data that causes the mobile computing device to wirelessly transmit audio from the telephone call directly to the computing system without the audio being transmitted to the removable computing device.

5. The computer-implemented method of claim 4, comprising:
receiving, by the removable computing device in response to the removable computing device having transmitted the data that causes the mobile computing device to initiate the communication, data that identifies characteristics of the telephone call; and
providing, by the removable computing device to the computing system, the data that identifies characteristics of the telephone call for presentation by the display of the computing system, wherein the presentation of the characteristics of the telephone call is provided concurrent with the wireless transmission of audio from the mobile computing device directly to the computing system.

6. The computer-implemented method of claim 1, comprising:
receiving, by the removable computing device and from the mobile computing device, data indicating that a telephone call has been initiated with the mobile computing device, wherein the data indicating that a telephone call has been initiated with the mobile computing device identifies characteristics of the telephone call initiated with the mobile computing device;

providing, by the removable computing device to the computing system, information including at least a portion of characteristics of the telephone call initiated with the mobile computing device for presentation by the display of the computing system;

receiving, by the removable computing device and from the computing system, an indication of user input received by the computing system to request that the mobile computing device accept the telephone call initiated with the mobile computing device; and transmitting, by the removable computing device for receipt by the mobile computing device, data that causes the mobile computing device to accept the telephone call initiated with the mobile computing device.

7. The computer-implemented method of claim 1, comprising:
outputting, by the removable computing device, an audio signal encoding an address that identifies the removable computing device, wherein the mobile computing device is configured to:
receive the audio signal,
decode the audio signal to obtain the address encoded in the audio signal,
transmit the address encoded in the audio signal to a server through a wireless communication,
in response to transmitting the address encoded in the audio signal to the server, receive data that identifies the removable computing device, and
establish a wireless communication channel with the removable computing device based at least on receiving the data that identifies the removable computing device.

8. The computer-implemented method of claim 1, wherein:
the contact information includes a telephone number;
the indication of user input received by the computing system to request that the mobile communication device initiate communication with the contact device of the selected contact that is identified by the contact information comprises message content for transmission in a message communication to the contact device that is identified by the telephone number; and
the data that causes the mobile computing device to initiate the communication causes the mobile computing device to transmit data that includes the message content through a wireless communication to the contact device that is identified by the telephone number.

9. The computer-implemented method of claim 1, comprising:
receiving, by the removable computing device and from the computing system, an indication of user input received by the computing system to request a message communication to a recipient identified by an identifier, the indication comprising message content to be included in the message communication to the recipient identified by the identifier; and
in response to receiving the indication, transmitting, by the removable computing device through a wireless communication to a server, a message communication to the recipient identified by the identifier that includes the message content.

10. The computer-implemented method of claim 1, wherein:
  providing, by the removable computing device and to the computing system, at least a portion of the contact information for presentation by the display of the computing system comprises providing, for each contact in at least a portion of the contact list that is assigned to the user account, a contact identifier for presentation by the display of the computing system; and
  receiving, by the removable computing device and from the computing system, an indication of user input received by the computing system comprises receiving an indication that a particular contact in the at least a portion of the contact list presented by the display of the computing system has been selected.

11. A system comprising:
at least one processor; and
a data store coupled to the one or more processors having instructions stored thereon which, when executed by the at least one processor, causes the one or more processors to perform operations comprising:
  receiving, by a removable computing device that is electrically connected to a computing system through a physical connection, contact information from a contact list that is assigned to a user account, wherein:
    the user account is associated with a mobile computing device that is in wireless communication with the removable computing device;
    the removable computing device is (i) insertable into a data communication port of the computing system, (ii) configured to maintain the physical connection through a friction fit with the data communication port of the computing system, (iii) equipped with software that enables the removable computing device to wirelessly communicate with the mobile computing device and to communicate with the computing system through the data communication port, and (iv) configured to physically disconnect from the computing system; and
    the contact information is wirelessly received by the removable computing device through a wireless communication from the mobile computing device or from a server system and includes, for one or more contacts, information for initiating communication with a contact device associated with the contact;
  providing, by the removable computing device and to the computing system, at least a portion of the contact information for presentation by a display of the computing system;
  receiving, by the removable computing device and from the computing system, an indication of user input received by the computing system to request that the mobile computing device initiate communication with a contact device of a selected contact that is identified by the contact information; and
  transmitting, by the removable computing device for receipt by the mobile computing device, data that causes the mobile computing device to initiate the communication with the contact device of the selected contact that is identified by the contact information.

12. The system of claim 11, wherein:
the computing system is a computing system installed in a vehicle;
the removable computing device is a computerized dongle; and
the mobile computing device is a smartphone.

13. The system of claim 11, wherein:
the contact information includes a telephone number; and
the communication that the mobile computing device initiates with the contact device of the selected contact that is identified by the contact information is a telephone call with the contact device that is identified by the telephone number.

14. The system of claim 13, wherein the data that causes the mobile computing device to initiate the communication is data that causes the mobile computing device to wirelessly transmit audio from the telephone call directly to the computing system without the audio being transmitted to the removable computing device.

15. The system of claim 14, the operations comprising:
  receiving, by the removable computing device in response to the removable computing device having transmitted the data that causes the mobile computing device to initiate the communication, data that identifies characteristics of the telephone call; and
  providing, by the removable computing device to the computing system, the data that identifies characteristics of the telephone call for presentation by the display of the computing system, wherein the presentation of the characteristics of the telephone call is provided concurrent with the wireless transmission of audio from the mobile computing device directly to the computing system.

16. The system of claim 11, the operations comprising:
receiving, by the removable computing device and from the mobile computing device, data indicating that a telephone call has been initiated with the mobile computing device, wherein the data indicating that a telephone call has been initiated with the mobile computing device identifies characteristics of the telephone call initiated with the mobile computing device;
  providing, by the removable computing device to the computing system, information including at least a portion of characteristics of the telephone call initiated with the mobile computing device for presentation by the display of the computing system;
  receiving, by the removable computing device and from the computing system, an indication of user input received by the computing system to request that the mobile computing device accept the telephone call initiated with the mobile computing device; and
  transmitting, by the removable computing device for receipt by the mobile computing device, data that causes the mobile computing device to accept the telephone call initiated with the mobile computing device.

17. The system of claim 11, the operations comprising:
outputting, by the removable computing device, an audio signal encoding an address that identifies the removable computing device, wherein the mobile computing device is configured to:
  receive the audio signal,
  decode the audio signal to obtain the address encoded in the audio signal,
  transmit the address encoded in the audio signal to a server through a wireless communication,
  in response to transmitting the address encoded in the audio signal to the server, receive data that identifies the removable computing device, and establish a wireless communication channel with the removable computing device based at least on receiving the data that identifies the removable computing device.

18. The system of claim 11, wherein:

the contact information includes a telephone number;

the indication of user input received by the computing system to request that the mobile communication device initiate communication with the contact device of the selected contact that is identified by the contact information comprises message content for transmission in a message communication to the contact device that is identified by the telephone number; and the data that causes the mobile computing device to initiate the communication causes the mobile computing device to transmit data that includes the message content through a wireless communication to the contact device that is identified by the telephone number.

19. The system of claim 11, the operations comprising:

receiving, by the removable computing device and from the computing system, an indication of user input received by the computing system to request a message communication to a recipient identified by an identifier, the indication comprising message content to be included in the message communication to the recipient identified by the identifier; and in response to receiving the indication, transmitting, by the removable computing device through a wireless communication to a server, a message communication to the recipient identified by the identifier that includes the message content.

20. The system of claim 11, wherein:

providing, by the removable computing device and to the computing system, at least a portion of the contact information for presentation by the display of the computing system comprises providing, for each contact in at least a portion of the contact list that is assigned to the user account, a contact identifier for presentation by the display of the computing system; and receiving, by the removable computing device and from the computing system, an indication of user input received by the computing system comprises receiving an indication that a particular contact in the at least a portion of the contact list presented by the display of the computing system has been selected.

* * * * *